(12) United States Patent
Yamada et al.

(10) Patent No.: US 11,022,354 B2
(45) Date of Patent: Jun. 1, 2021

(54) AIR CONDITIONER

(71) Applicant: DAIKIN INDUSTRIES, LTD., Osaka (JP)

(72) Inventors: Takuro Yamada, Osaka (JP); Yuusuke Nakagawa, Osaka (JP); Yuusuke Oka, Osaka (JP); Masahiro Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 149 days.

(21) Appl. No.: 16/334,565

(22) PCT Filed: Sep. 26, 2017

(86) PCT No.: PCT/JP2017/034752
§ 371 (c)(1),
(2) Date: Mar. 19, 2019

(87) PCT Pub. No.: WO2018/062184
PCT Pub. Date: Apr. 5, 2018

(65) Prior Publication Data
US 2019/0212042 A1 Jul. 11, 2019

(30) Foreign Application Priority Data

Sep. 30, 2016 (JP) .............................. JP2016-192561

(51) Int. Cl.
*F25B 41/31* (2021.01)
*F25B 49/02* (2006.01)
(Continued)

(52) U.S. Cl.
CPC .............. *F25B 41/31* (2021.01); *F25B 49/02* (2013.01); *F25B 13/00* (2013.01); *F25B 41/39* (2021.01);
(Continued)

(58) Field of Classification Search
CPC .. F25B 41/062; F25B 49/02; F25B 2313/007; F25B 2400/13; F25B 2700/1931;
(Continued)

(56) References Cited

U.S. PATENT DOCUMENTS 6,804,975 B2 10/2004 Park
2004/0154323 A1* 8/2004 Eustice ................ B60H 1/3229
62/222

(Continued)

FOREIGN PATENT DOCUMENTS

| EP | 3 109 566 A1 | 12/2016 |
| JP | 8-159587 A | 6/1996 |
| JP | 9-292166 A | 11/1997 |
| JP | 2002-61879 A | 2/2002 |
| JP | 2002-243312 A | 8/2002 |
| JP | 2003-130482 A | 5/2003 |
| JP | 2006-112708 A | 4/2006 |
| JP | 2007-225264 A | 9/2007 |

(Continued)

OTHER PUBLICATIONS

International Search Report, issued in PCT/JP2017/034752, PCT/ISA/210, dated Dec. 26, 2017.

*Primary Examiner* — Nelson J Nieves
(74) *Attorney, Agent, or Firm* — Birch, Stewart, Kolasch & Birch, LLP

(57) ABSTRACT

Noise that is generated from an indoor unit is suppressed when performing two-phase transport of refrigerant by using a liquid-pressure-adjusting expansion valve in an air conditioner including an outdoor unit, a plurality of indoor units each including an indoor heat exchanger, a relay unit that switches the plurality of indoor heat exchangers so that the indoor heat exchangers individually function as an evaporator or radiator for refrigerant, and a liquid-refrigerant connection pipe and a gas-refrigerant connection pipe that connect the outdoor unit and the indoor unit via the relay unit. The relay unit includes a relay expansion valve that further decompresses the refrigerant that has been decompressed by the liquid-pressure-adjusting expansion valve.

18 Claims, 13 Drawing Sheets

(51) Int. Cl.
*F25B 13/00* (2006.01)
*F25B 41/39* (2021.01)

(52) U.S. Cl.
CPC ... *F25B 2313/005* (2013.01); *F25B 2313/007* (2013.01); *F25B 2313/0231* (2013.01); *F25B 2313/0233* (2013.01); *F25B 2400/13* (2013.01); *F25B 2500/12* (2013.01); *F25B 2500/222* (2013.01); *F25B 2600/2513* (2013.01); *F25B 2700/1931* (2013.01); *F25B 2700/21152* (2013.01)

(58) Field of Classification Search
CPC ...... F25B 2313/0231; F25B 2341/0662; F25B 2700/21152; F25B 2313/0233; F25B 2313/005; F25B 13/00; F25B 2600/2513; F25B 2500/12; F25B 2500/222
See application file for complete search history.

(56) References Cited

U.S. PATENT DOCUMENTS

| | | |
|---|---|---|
| 2011/0192184 A1 | 8/2011 | Yamashita et al. |
| 2014/0033749 A1* | 2/2014 | Tamaki ............ F25B 49/005 62/126 |
| 2015/0316275 A1 | 11/2015 | Yamashita et al. |
| 2016/0146496 A1 | 5/2016 | Yamashita |

FOREIGN PATENT DOCUMENTS

| | | |
|---|---|---|
| JP | 2010-19472 A | 1/2010 |
| JP | 2010-169309 A | 8/2010 |
| JP | 2012-13339 A | 1/2012 |
| WO | WO 2015/029160 A1 | 3/2015 |
| WO | WO 2015/125219 A1 | 8/2015 |

* cited by examiner

AIR CONDITIONER

TECHNICAL FIELD

The present invention relates to an air conditioner, and, in particular, to an air conditioner including an outdoor unit including an outdoor heat exchanger, a plurality of indoor units each including an indoor heat exchanger, a relay unit that switches the plurality of indoor heat exchangers so that the indoor heat exchangers individually function as an evaporator or radiator for refrigerant, and a liquid-refrigerant connection pipe and a gas-refrigerant connection pipe that connect the outdoor unit and the indoor units to each other via the relay unit.

BACKGROUND ART

An air conditioner known in the art includes an outdoor unit including a compressor and an outdoor heat exchanger, an indoor unit including an indoor heat exchanger, and a liquid-refrigerant connection pipe and a gas-refrigerant connection pipe that connect the outdoor unit and the indoor unit to each other. The air conditioner performs an operation in which refrigerant circulates in order of the compressor, the outdoor heat exchanger, the liquid-refrigerant connection pipe, the indoor heat exchanger, the gas-refrigerant connection pipe, and the compressor. PTL 1 (International Publication No. 2015/029160) describes an example of such an air conditioner, in which a liquid-pressure-adjusting expansion valve is disposed in an outdoor liquid-refrigerant pipe that connects the outdoor heat exchanger and the liquid-refrigerant connection pipe. The liquid-pressure-adjusting expansion valve decompresses refrigerant so that refrigerant flowing through the liquid-refrigerant connection pipe enters a gas-liquid two-phase state. That is, when performing an operation in which refrigerant circulates in order of the compressor, the outdoor heat exchanger, the liquid-refrigerant connection pipe, the indoor heat exchanger, the gas-refrigerant connection pipe, and the compressor, the air conditioner performs two-phase transport of refrigerant, with which refrigerant in a gas-liquid two-phase state is fed from the outdoor unit to the indoor unit through the liquid-refrigerant connection pipe by performing decompression by using the liquid-pressure-adjusting expansion valve.

SUMMARY OF THE INVENTION

The structure described in PTL 1, for performing two-phase transport of refrigerant, can be used for air conditioners of other types. For example, the structure described in PTL 1, for performing two-phase transport of refrigerant, may be used for an air conditioner in which a relay unit, which switches indoor heat exchangers of a plurality of indoor units to individually function as an evaporator or radiator for refrigerant, is interposed between an outdoor unit and the indoor units.

In this case, when feeding the refrigerant, which has been decompressed by the liquid-pressure-adjusting expansion valve in the outdoor unit to enter a gas-liquid two-phase state, from the outdoor heat exchanger to at least one of the indoor heat exchangers that functions as an evaporator for refrigerant through the liquid-refrigerant connection pipe and the relay unit, the refrigerant is fed to the indoor unit through the liquid-refrigerant connection pipe and the relay unit and is decompressed to low pressure by the indoor expansion valves in the indoor unit. At this time, because the refrigerant in a gas-liquid two-phase state flows into the indoor expansion valve, refrigerant passing noise in the indoor expansion valve becomes louder, and noise generated from the indoor unit increases.

An object of the present invention is to suppress noise that is generated from an indoor unit when performing two-phase transport of refrigerant by using a liquid-pressure adjusting expansion valve in an air conditioner that includes an outdoor unit, a plurality of indoor units each including an indoor heat exchanger, a relay unit that switches the plurality of indoor heat exchangers so that the indoor heat exchangers individually function as an evaporator or radiator for refrigerant, and a liquid-refrigerant connection pipe and a gas-refrigerant connection pipe that connect the outdoor unit and the indoor units to each other via the relay unit.

An air conditioner according to a first aspect includes an outdoor unit including a compressor and an outdoor heat exchanger, a plurality of indoor units each including an indoor heat exchanger, at least one relay unit that switches the plurality of indoor heat exchangers so that the indoor heat exchangers individually function as an evaporator for refrigerant or a radiator for refrigerant, and a liquid-refrigerant connection pipe and a gas-refrigerant connection pipe that connect the outdoor unit and the indoor units to each other via the relay unit. The outdoor unit further includes a liquid-pressure-adjusting expansion valve in an outdoor liquid-refrigerant pipe that connects a liquid-side end of the outdoor heat exchanger and the liquid-refrigerant connection pipe, the liquid-pressure-adjusting expansion valve decompressing the refrigerant flowing through the liquid-refrigerant connection pipe so that the refrigerant enters a gas-liquid two-phase state when feeding the refrigerant from the outdoor heat exchanger to at least one of the indoor heat exchangers that functions as an evaporator for the refrigerant through the liquid-refrigerant connection pipe and the relay unit. The relay unit includes a relay expansion valve that further decompresses the refrigerant that has been decompressed by the liquid-pressure-adjusting expansion valve.

As described above, an operation of decompressing the refrigerant in a gas-liquid two-phase state, which has been decompressed by the liquid-pressure-adjusting expansion valve, to low pressure is performed by using the relay expansion valve of the relay unit. Therefore, refrigerant passing noise, which may be generated when the refrigerant in a gas-liquid two-phase state flows into the expansion valve, can be prevented from being generated in the indoor units.

Thus, in the structure including the liquid-pressure-adjusting expansion valve, generation of noise from the indoor units can be suppressed by providing the relay unit with the relay expansion valve and by decompressing refrigerant in a gas-liquid two-phase state that has been decompressed by the liquid-pressure-adjusting expansion valve.

An air conditioner according to a second aspect is the air conditioner according to the first aspect, in which the relay unit or the relay expansion valve includes a silencer.

When decompression of refrigerant in a gas-liquid two-phase state that has been decompressed by the liquid-pressure-adjusting expansion valve is performed by using the relay expansion valve, the relay unit generates noise. If the relay unit is disposed near the indoor unit, the noise may be transmitted to the indoor unit.

To prevent this, the relay unit or the relay expansion valve includes a silencer as described above.

In this case, generation of noise from the relay unit can be suppressed, and the relay unit can be disposed near the indoor unit.

An air conditioner according to a third aspect is the air conditioner according to the first aspect, in which the relay unit is disposed at a position that is separated by 5 m or more from a connection portion of each of the indoor units to which the liquid-refrigerant connection pipe is connected, as measured along a length of the liquid-refrigerant connection pipe.

When decompression of refrigerant in a gas-liquid two-phase state that has been decompressed by the liquid-pressure-adjusting expansion valve is performed by using the relay expansion valve, the relay unit generates noise. If the relay unit is disposed near the indoor unit, the noise may be transmitted to the indoor unit.

To prevent this, as described above, the relay unit is disposed at a position that is separated by 5 m or more from a connection portion of each of the indoor units to which the liquid-refrigerant connection pipe is connected, as measured along the length of the liquid-refrigerant connection pipe.

In this case, transmission of noise from the relay unit to the indoor unit can be suppressed.

An air conditioner according to a fourth aspect is the air conditioner according to the first aspect, in which the relay unit is disposed at a position that is separated by 10 m or more from a connection portion of each of the indoor units to which the liquid-refrigerant connection pipe is connected, as measured along a length of the liquid-refrigerant connection pipe.

When decompression of refrigerant in a gas-liquid two-phase state that has been decompressed by the liquid-pressure-adjusting expansion valve is performed by using the relay expansion valve, the relay unit generates noise. If the relay unit is disposed near the indoor unit, the noise may be transmitted to the indoor unit.

To prevent this, as described above, the relay unit is disposed at a position that is separated by 10 m or more from a connection portion of each of the indoor units to which the liquid-refrigerant connection pipe is connected, as measured along the length of the liquid-refrigerant connection pipe.

In this case, transmission of noise from the relay unit to the indoor unit can be sufficiently suppressed.

An air conditioner according to a fifth aspect is the air conditioner according to any one of the first to fourth aspects, further including refrigerant-leakage detection means for detecting leakage of the refrigerant. The relay unit further includes a relay gas valve that is opened or closed when switching the indoor heat exchangers to function as an evaporator for the refrigerant or a radiator for the refrigerant. A controller that controls components of the outdoor unit, the indoor units, and the relay unit closes the relay expansion valve and the relay gas valve if the refrigerant-leakage detection means detects leakage of the refrigerant. The refrigerant-leakage detection means may be a refrigerant sensor that directly detects leaked refrigerant. Alternatively, the refrigerant-leakage detection means may detect occurrence of leakage of refrigerant or the amount of leaked refrigerant from the relationship between the temperature of refrigerant in an indoor heat exchanger and the ambient temperature in the indoor heat exchanger or the like.

In this case, as described above, the air conditioner further includes the refrigerant-leakage detection means, and, if the refrigerant-leakage detection means detects leakage of refrigerant, the controller closes the relay expansion valve and the relay gas valve. Therefore, flow of refrigerant into an indoor unit from the connection pipe is prevented, and increase in the concentration of refrigerant in an indoor space can be suppressed.

An air conditioner according to a sixth aspect is the air conditioner according to any one of the first to fifth aspects, in which each of the indoor units further includes an indoor expansion valve that is connected to a liquid-side end of the indoor heat exchanger. A controller that controls components of the outdoor unit, the indoor units, and the relay unit fully opens the indoor expansion valve and controls an opening degree of the relay expansion valve when feeding the refrigerant from the outdoor heat exchanger to at least one of the indoor heat exchangers that functions as an evaporator for the refrigerant through the liquid-refrigerant connection pipe and the relay unit; and the controller fully opens the relay expansion valve and controls the opening degree of the indoor expansion valve when feeding the refrigerant from the compressor to at least one of the indoor heat exchangers that functions as a radiator for the refrigerant through the gas-refrigerant connection pipe and the relay unit.

An air conditioner according to a seventh aspect is the air conditioner according to the sixth aspect, in which the controller closes the relay expansion valve while keeping the indoor expansion valve fully open when stopping the compressor from a state in which the control unit fully opens the indoor expansion valve and controls the opening degree of the relay expansion valve, and the controller closes the indoor expansion valve while keeping the relay expansion valve fully open when stopping the compressor from a state in which the control unit fully opens the relay expansion valve and controls the opening degree of the indoor expansion valve.

In an air conditioner that includes indoor units each including an indoor expansion valve, if the relay unit includes a relay expansion valve, not only when feeding refrigerant from the outdoor heat exchanger to an indoor heat exchanger that functions as an evaporator for refrigerant through the liquid-refrigerant connection pipe and the relay unit, but also when feeding refrigerant from the compressor to an indoor heat exchanger that functions as a radiator for refrigerant through the gas-refrigerant connection pipe and the relay unit, the indoor expansion valve may be fully opened and the opening degree of the relay expansion valve may be controlled. When stopping the compressor, also when feeding refrigerant from the compressor to an indoor heat exchanger that functions as a radiator for refrigerant through the gas-refrigerant connection pipe and the relay unit, the relay expansion valve may be closed while keeping the indoor expansion valve fully open from a state in which the opening degree of the relay expansion valve is controlled.

However, also when feeding refrigerant from the compressor to an indoor heat exchanger that functions as a radiator for refrigerant through the gas-refrigerant connection pipe and the relay unit, if the indoor expansion valve is fully opened and the opening degree of the relay expansion valve is controlled, the amount of refrigerant that accumulates in a portion of the liquid-refrigerant connection pipe between the indoor unit and the relay unit increases. Also when stopping the compressor, if the relay expansion valve is closed while keeping the indoor expansion valve fully open from a state in which the opening degree of the relay expansion valve is controlled, the amount of refrigerant that accumulates in a portion of the liquid-refrigerant connection pipe between the indoor unit and the relay unit increases. In particular, the amount of accumulated refrigerant considerably increases, if the relay unit is disposed at a position that is separated from the indoor unit (such as a position separated by 10 m or more from a connection portion of the indoor unit to which the liquid-refrigerant connection pipe is connected, as measured along the length of the liquid-refrigerant connection pipe).

Therefore, as described above, the controller fully opens the relay expansion valve and controls the opening degree of the indoor expansion valve, when feeding refrigerant from the compressor to the indoor heat exchanger that functions as a radiator for refrigerant through the gas-refrigerant connection pipe and the relay unit. Also when stopping the compressor from this state, the controller closes the indoor expansion valve while keeping the relay expansion valve fully open from the state in which the controller controls the opening degree of the indoor expansion valve.

Thus, when feeding refrigerant from the compressor to the indoor heat exchanger that functions as a radiator for refrigerant through the gas-refrigerant connection pipe and the relay unit, the amount of accumulated refrigerant can be reduced, because refrigerant that has been decompressed by the indoor expansion valve flows to a portion of the liquid-refrigerant connection pipe between the indoor unit and the relay unit. Also when stopping the compressor, because the indoor expansion valve is closed, the amount of refrigerant that accumulates in a portion of the liquid-refrigerant connection pipe between the indoor unit and the relay unit can be reduced.

An air conditioner according to an eighth aspect is the air conditioner according to any one of the first to seventh aspects, in which the relay unit further includes a relay refrigerant cooler that cools the refrigerant that has been decompressed by the liquid-pressure-adjusting expansion valve, and the relay expansion valve further decompresses the refrigerant that has been cooled by the relay refrigerant cooler.

As described above, the relay refrigerant cooler of the relay unit cools refrigerant in a gas-liquid two-phase state that has been decompressed by the liquid-pressure-adjusting expansion valve. Therefore, refrigerant passing noise, which may be generated when the refrigerant in a gas-liquid two-phase state passes through the relay expansion valve, can be prevented from being generated in the relay unit.

Thus, in the structure including the liquid-pressure-adjusting expansion valve, generation of noise not only from the indoor units but also from the relay unit can be suppressed by providing the relay refrigerant cooler in the relay unit and by cooling refrigerant in a gas-liquid two-phase state that has been decompressed by the liquid-pressure-adjusting expansion valve.

DESCRIPTION OF EMBODIMENTS

Hereinafter, an air conditioner according to an embodiment of the present invention will be described with reference to the drawings. Specific structures of an air conditioner according to an embodiment of the present invention are not limited to those of the embodiment and modifications described below and may be changed within the spirit and scope of the invention.

(1) Structure

Figure 1:
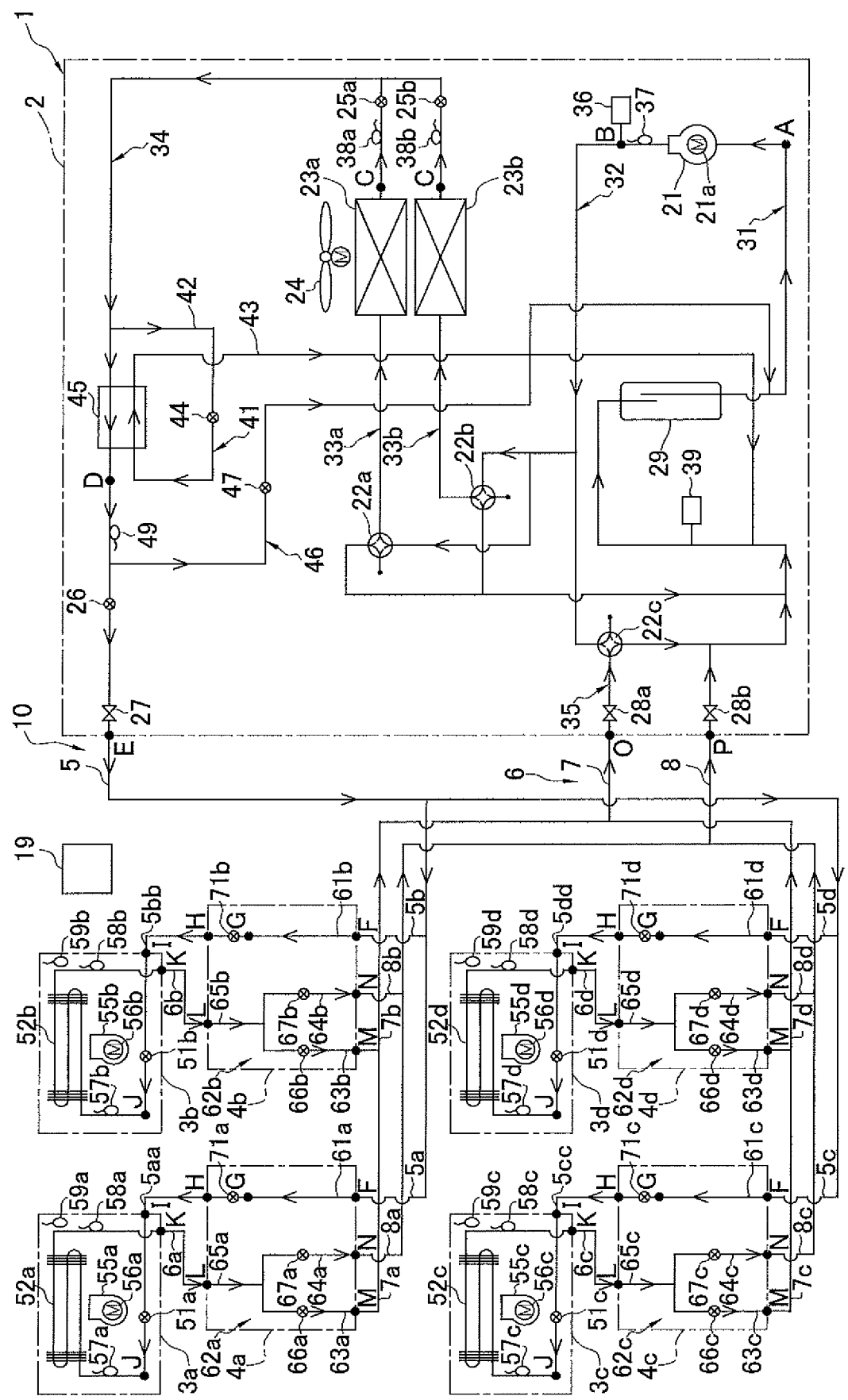
FIG. 1 is a schematic view of an air conditioner according to an embodiment of the present invention (illustrating flow of refrigerant during cooling only operation).

FIG. 1 is a schematic view of an air conditioner 1 according to an embodiment of the present invention. The air conditioner 1 is a device that performs cooling and heating of indoor spaces in a building or the like through a vapor compression refrigeration cycle. The air conditioner 1 mainly includes an outdoor unit 2; a plurality of (here, four) indoor units 3a, 3b, 3c, and 3d that are connected in parallel with each other; relay units 4a, 4b, 4c, and 4d that are respectively connected to the indoor units 3a, 3b, 3c, and 3d; refrigerant connection pipes 5 and 6 that connect the outdoor unit 2 and the indoor units 3a, 3b, 3c, and 3d to each other via the relay units 4a, 4b, 4c, and 4d; and a control unit 19 that controls the components of the outdoor unit 2, the indoor units 3a, 3b, 3c, and 3d, and the relay units 4a, 4b, 4c, and 4d. A vapor-compression refrigerant circuit 10 of the air conditioner 1 is formed by connecting the outdoor unit 2; the indoor units 3a, 3b, 3c, and 3d; the relay units 4a, 4b, 4c, and 4d; and the connection pipes 5 and 6. The refrigerant circuit 10 is filled with a refrigerant, such as R32. In the air conditioner 1, the indoor units 3a, 3b, 3c, and 3d can individually perform cooling operation or heating operation by using the relay units 4a, 4b, 4c, and 4d. By feeding refrigerant from an indoor unit that performs heating operation to an indoor unit that performs cooling operation, the air conditioner 1 can perform heat recovery between the indoor units (can perform a simultaneous-cooling-heating operation of simultaneously performing cooling operation and heating operation).

<Liquid-Refrigerant Connection Pipe>

The liquid-refrigerant connection pipe 5 mainly includes a junction pipe portion that extends from the outdoor unit 2;

a plurality of (here, four) first branch-pipe portions 5a, 5b, 5c, and 5d that branch off from positions in front of the relay units 4a, 4b, 4c, and 4d; and second branch-pipe portions 5aa, 5bb, 5cc, and 5dd that connect the relay units 4a, 4b, 4c, and 4d and the indoor units 3a, 3b, 3c, and 3d. The gas-refrigerant connection pipe 6 mainly includes a high/low-pressure-gas-refrigerant connection pipe 7; a low-pressure-gas-refrigerant connection pipe 8; and branch-pipe portions 6a, 6b, 6c, and 6d that connect the relay units 4a, 4b, 4c, and 4d and the indoor units 3a, 3b, 3c, and 3d. The high/low-pressure-gas-refrigerant connection pipe 7 includes a junction pipe portion that extends from the outdoor unit 2; and a plurality of (here, four) branch-pipe portions 7a, 7b, 7c, and 7d that branch off from positions in front of the relay units 4a, 4b, 4c, and 4d. The low-pressure-gas-refrigerant connection pipe 8 includes a junction pipe portion that extends from the outdoor unit 2; and a plurality of (here, four) branch-pipe portions 8a, 8b, 8c, and 8d that branch off from positions in front of the relay units 4a, 4b, 4c, and 4d.

<Indoor Unit>

The indoor units 3a, 3b, 3c, and 3d are set in indoor spaces of a building or the like. As described above, the indoor units 3a, 3b, 3c, and 3d are connected to the outdoor unit 2 via the liquid-refrigerant connection pipe 5, the gas-refrigerant connection pipe 6 (the high/low-pressure-gas-refrigerant connection pipe 7, the low-pressure-gas-refrigerant connection pipe 8, and the branch-pipe portions 6a, 6b, 6c, and 6d), and the relay units 4a, 4b, 4c, and 4d. The indoor units 3a, 3b, 3c, and 3d constitute parts of the refrigerant circuit 10.

Next, the structures of the indoor units 3a, 3b, 3c, and 3d will be described. Here, only the structure of the indoor unit 3a will be described, because the structures of the indoor unit 3a and the indoor units 3b, 3c, and 3d are the same. Elements of the indoor units 3b, 3c, or 3d will be denoted by respectively attaching suffixes "b", "c" or "d", instead of "a" used for elements of the indoor unit 3a, and descriptions thereof will be omitted.

The indoor unit 3a mainly includes an indoor expansion valve 51a and an indoor heat exchanger 52a. The indoor unit 3a further includes an indoor liquid-refrigerant pipe 53a that connects the liquid-side end of the indoor heat exchanger 52a and the liquid-refrigerant connection pipe 5 (the branch-pipe portion 5aa) and an indoor gas-refrigerant pipe 54a that connects the gas-side end of the indoor heat exchanger 52a and the gas-refrigerant connection pipe 6 (the branch-pipe portion 6a).

The indoor expansion valve 51a is an electric expansion valve that can adjust the flow rate of refrigerant that flows through the indoor heat exchanger 52a while decompressing the refrigerant. The indoor expansion valve 51a is disposed in the indoor liquid-refrigerant pipe 53a.

The indoor heat exchanger 52a is a heat exchanger that functions as an evaporator for refrigerant and cools indoor air or functions as a radiator for refrigerant and heats indoor air. The indoor unit 3a includes an indoor fan 55a for sucking indoor air into the indoor unit 3a, causing the indoor air to exchange heat with refrigerant in the indoor heat exchanger 52a, and then supplying the air into an indoor space. That is, the indoor unit 3a includes the indoor fan 55a, which is a fan that supplies, to the indoor heat exchanger 52a, indoor air as a cooling source or a heating source for refrigerant flowing through the indoor heat exchanger 52a. The indoor fan 55a is driven by an indoor fan motor 56a.

The indoor unit 3a includes various sensors. To be specific, the indoor unit 3a includes an indoor-heat-exchange liquid-side sensor 57a for detecting the temperature Trl of refrigerant at the liquid-side end of the indoor heat exchanger 52a, an indoor-heat-exchange gas-side sensor 58a for detecting the temperature Trg of refrigerant at the gas-side end of the indoor heat exchanger 52a, and an indoor air sensor 59a for detecting the temperature Tra of indoor air sucked into the indoor unit 3a.

<Outdoor Unit>

The outdoor unit 2 is set outside a building or the like. As described above, the outdoor unit 2 is connected to the indoor units 3a, 3b, 3c, and 3d via the liquid-refrigerant connection pipe 5, the gas-refrigerant connection pipe 6 (the high/low-pressure-gas-refrigerant connection pipe 7, the low-pressure-gas-refrigerant connection pipe 8, and the branch-pipe portions 6a, 6b, 6c, and 6d), and the relay units 4a, 4b, 4c, and 4d. The outdoor unit 2 constitutes a part of the refrigerant circuit 10.

The outdoor unit 2 mainly includes a compressor 21 and one or more (here, two) outdoor heat exchangers 23a and 23b. The outdoor unit 2 further includes switching mechanisms 22a and 22b for switching between a radiator operation state, in which the outdoor heat exchangers 23a and 23b function as radiators for refrigerant, and an evaporator operation state, in which the outdoor heat exchangers 23a and 23b function as evaporators for refrigerant. The switching mechanisms 22a and 22b and the suction side of the compressor 21 are connected by a suction refrigerant pipe 31. An accumulator 29, which temporarily stores refrigerant to be sucked into the compressor 21, is disposed in the suction refrigerant pipe 31. The discharge side of the compressor 21 and the switching mechanisms 22a and 22b are connected by a discharge refrigerant pipe 32. The switching mechanism 22a and 22b and the gas-side ends of the outdoor heat exchangers 23a and 23b are connected by first outdoor gas-refrigerant pipes 33a and 33b. The liquid-side ends of the outdoor heat exchangers 23a and 23b and the liquid-refrigerant connection pipe 5 are connected by an outdoor liquid-refrigerant pipe 34. A liquid-side shutoff valve 27 is disposed in a connection portion of the outdoor liquid-refrigerant pipe 34 to which the liquid-refrigerant connection pipe 5 is connected. The outdoor unit 2 includes a third switching mechanism 22c for switching between a refrigerant outflow state, in which refrigerant discharged from the compressor 21 is fed to the high/low-pressure-gas-refrigerant connection pipe 7, and a refrigerant inflow state, in which refrigerant flowing through the high/low-pressure-gas-refrigerant connection pipe 7 is fed to the suction refrigerant pipe 31. The third switching mechanism 22c and the high/low-pressure-gas-refrigerant connection pipe 7 are connected by a second outdoor gas-refrigerant pipe 35. The third switching mechanism 22c and the suction side of the compressor 21 are connected by the suction refrigerant pipe 31. The discharge side of the compressor 21 and the third switching mechanism 22c are connected by the discharge refrigerant pipe 32. A high/low-pressure gas-side shutoff valve 28a is disposed in a connection portion of the second outdoor gas-refrigerant pipe 35 to which the high/low-pressure-gas-refrigerant connection pipe 7 is connected. The suction refrigerant pipe 31 is connected to the low-pressure-gas-refrigerant connection pipe 8. A low-pressure gas-side shutoff valve 28b is disposed in a connection portion of the suction refrigerant pipe 31 to which the low-pressure-gas-refrigerant connection pipe 8 is connected. The liquid-side shutoff valve 27 and the gas-side shutoff valves 28a and 28b are valves that are opened and closed manually.

The compressor 21 is a device for compressing refrigerant. For example, a hermetically-sealed compressor in which a positive-displacement compression element (not shown), such as a rotary compression element or a scroll compression element, is rotated by a compressor motor 21a is used as the compressor 21.

The first switching mechanism 22a is a mechanism that can switch the flow of refrigerant in the refrigerant circuit 10 as follows: when causing the first outdoor heat exchanger 23a to function as a radiator for refrigerant (hereinafter, referred to as "the outdoor radiator state"), the first switching mechanism 22a connects the discharge side of the compressor 21 and the gas side of the first outdoor heat exchanger 23a (see the solid lines in the first switching mechanism 22a in FIG. 1); and, when causing the first outdoor heat exchanger 23a to function as an evaporator for refrigerant (hereinafter, referred to as "the outdoor evaporator state"), the first switching mechanism 22a connects the suction side of the compressor 21 and the gas side of the first outdoor heat exchanger 23a (see the broken lines in the first switching mechanism 22a in FIG. 1). For example, the first switching mechanism 22a is a four-way switching valve. The second switching mechanism 22b is a mechanism that can switch the flow of refrigerant in the refrigerant circuit 10 as follows: when causing the second outdoor heat exchanger 23b to function as a radiator for refrigerant (hereinafter, referred to as "the outdoor radiator state"), the second switching mechanism 22b connects the discharge side of the compressor 21 and the gas side of the second outdoor heat exchanger 23b (see the solid lines in the second switching mechanism 22b in FIG. 1); and, when causing the second outdoor heat exchanger 23b to function as an evaporator for refrigerant (hereinafter, referred to as "the outdoor evaporator state"), the second switching mechanism 22b connects the suction side of the compressor 21 and the gas side of the second outdoor heat exchanger 23b (see the broken lines in the second switching mechanism 22b in FIG. 1). For example, the second switching mechanism 22b is a four-way switching valve. By changing the switching state of the switching mechanisms 22a and 22b, the outdoor heat exchangers 23a and 23b can be switched so that the outdoor heat exchangers 23a and 23b individually function as an evaporator or radiator for refrigerant.

The first outdoor heat exchanger 23a is a heat exchanger that functions as a radiator for refrigerant or as an evaporator for refrigerant. The second outdoor heat exchanger 23b is a heat exchanger that functions as a radiator for refrigerant or as an evaporator for refrigerant. The outdoor unit 2 includes an outdoor fan 24 for sucking outdoor air into the outdoor unit 2, causing the outdoor air to exchange heat with refrigerant in the outdoor heat exchangers 23a and 23b, and then discharging the air to the outside. That is, the outdoor unit 2 includes the outdoor fan 24, which is a fan that supplies, to the outdoor heat exchangers 23a and 23b, outdoor air as a cooling source or a heating source for refrigerant flowing through the outdoor heat exchangers 23a and 23b. The outdoor fan 24 is driven by an outdoor fan motor 24a.

The third switching mechanism 22c is a mechanism that can switch the flow of refrigerant in the refrigerant circuit 10 as follows: when feeding refrigerant discharged from the compressor 21 to the high/low-pressure-gas-refrigerant connection pipe 7 (hereinafter, referred to as "the refrigerant outflow state"), the third switching mechanism 22c connects the discharge side of the compressor 21 and the high/low-pressure-gas-refrigerant connection pipe 7 (see the broken lines in the third switching mechanism 22c in FIG. 1); and, when feeding refrigerant flowing through the high/low-pressure-gas-refrigerant connection pipe 7 to the suction refrigerant pipe 31 (hereinafter, referred to as "the refrigerant inflow state"), the third switching mechanism 22c connects the suction side of the compressor 21 and the high/low-pressure-gas-refrigerant connection pipe 7 (see the solid lines in the third switching mechanism 22c in FIG. 1). For example, the third switching mechanism 22c is a four-way switching valve.

Focusing on the outdoor heat exchangers 23a and 23b, the liquid-refrigerant connection pipe 5, the relay units 4a, 4b, 4c, and 4d, and the indoor heat exchangers 52a, 52b, 52c, and 52d, the air conditioner 1 performs operations (a cooling only operation and cooling main operation) in which refrigerant is fed from the outdoor heat exchangers 23a and 23b to the indoor heat exchangers 52a, 52b, 52c, and 52d, which function as evaporators for refrigerant, through the liquid-refrigerant connection pipe 5 and the relay units 4a, 4b, 4c, and 4d. The term "cooling only operation" refers to an operation state in which only indoor heat exchangers that function as evaporators for refrigerant (that is, indoor units that perform cooling operations) exist. The term "cooling main operation" refers to an operation state in which indoor heat exchangers that function as evaporators for refrigerant and indoor heat exchangers that function as radiators for refrigerant (that is, indoor units that perform heating operations) coexist, and, as a whole, load on the evaporator side (that is, cooling load) is larger. Focusing on the compressor 21, the gas-refrigerant connection pipe 6, the relay units 4a, 4b, 4c, and 4d, and the indoor heat exchangers 52a, 52b, 52c, and 52d, the air conditioner 1 performs operations (a heating only operation and heating main operation) in which refrigerant is fed from the compressor 21 to the indoor heat exchangers 52a, 52b, 52c, and 52d, which function as radiators for refrigerant, through the gas-refrigerant connection pipe 6 and the relay units 4a, 4b, 4c, and 4d. The term "heating only operation" refers to an operation state in which only indoor heat exchangers that function as radiators for refrigerant (that is, indoor units that perform heating operations) exist. The term "heating main operation" refers to an operation state in which indoor heat exchangers that function as radiators for refrigerant and indoor heat exchangers that function as evaporators for refrigerant coexist, and, as a whole, load on the radiator side (that is, heating load) is larger. When performing cooling only operation and cooling main operation, at least one of the switching mechanisms 22a and 22b is switched to an outdoor radiator state, the outdoor heat exchangers 23a and 23b as a whole function as a radiator for refrigerant, and refrigerant flows from the outdoor unit 2 to the indoor units 3a, 3b, 3c, and 3d through the liquid-refrigerant connection pipe 5 and the relay units 4a, 4b, 4c, and 4d. When performing heating only operation and heating main operation, at least one of the switching mechanisms 22a and 22b is switched to an outdoor evaporator state, the third switching mechanism 22c is switched to a refrigerant outflow state and the outdoor heat exchangers 23a and 23b as a whole function as an evaporator for refrigerant, and refrigerant flows from the indoor units 3a, 3b, 3c, and 3d to the outdoor unit 2 through the liquid-refrigerant connection pipe 5 and the relay units 4a, 4b, 4c, and 4d.

Outdoor expansion valves 25a and 25b and a liquid-pressure-adjusting expansion valve 26 are disposed in the outdoor liquid-refrigerant pipe 34. The outdoor expansion valves 25a and 25b are electric expansion valves that decompress refrigerant during heating only operation and heating main operation. The outdoor expansion valves 25a and 25b are disposed in portions of the outdoor liquid-refrigerant pipe 34 that are close to the liquid-side ends of the outdoor heat exchangers 23a and 23b. The liquidpressure-adjusting expansion valve 26 is an electric expansion valve that decompresses refrigerant so that refrigerant that flows through the liquid-refrigerant connection pipe 5 enters a gas-liquid two-phase state during cooling only operation and cooling main operation (that is, when refrigerant flows from the outdoor heat exchangers 23a and 23b to the indoor heat exchangers 52a, 52b, 52c, and 52d, which function as evaporators for refrigerant, through the liquid-refrigerant connection pipe 5 and the relay units 4a, 4b, 4c, and 4d). The liquid-pressure-adjusting expansion valve 26 is disposed in a portion of the outdoor liquid-refrigerant pipe 34 close to the liquid-refrigerant connection pipe 5. The liquid-pressure-adjusting expansion valve 26 is disposed in a portion of the outdoor liquid-refrigerant pipe 34 closer than the outdoor expansion valves 25a and 25b to the liquid-refrigerant connection pipe 5.

When performing cooling only operation and cooling main operation, the air conditioner 1 performs two-phase transport of refrigerant, with which refrigerant in a gas-liquid two-phase state is fed from the outdoor unit 2 to the indoor units 3a, 3b, 3c, and 3d through the liquid-refrigerant connection pipe 5 and the relay units 4a, 4b, 4c, and 4d by using the liquid-pressure-adjusting expansion valve 26.

An outdoor refrigerant-return pipe 41 is connected to the outdoor liquid-refrigerant pipe 34, and an outdoor refrigerant cooler 45 is disposed in the outdoor refrigerant-return pipe 41. The outdoor refrigerant-return pipe 41 is a refrigerant pipe that branches a part of refrigerant flowing through the outdoor liquid-refrigerant pipe 34 and feeds the part of refrigerant to the compressor 21. The outdoor refrigerant cooler 45 is a heat exchanger that cools refrigerant flowing through a portion of the outdoor liquid-refrigerant pipe 34 that is closer than the liquid-pressure-adjusting expansion valve 26 to the outdoor heat exchangers 23a and 23b by using refrigerant flowing through the outdoor refrigerant-return pipe 41. The outdoor expansion valves 25a and 25b are disposed in portions of the outdoor liquid-refrigerant pipe 34 that are closer than the outdoor refrigerant cooler 45 to the outdoor heat exchangers 23a and 23b. The liquid-pressure-adjusting expansion valve 26 is disposed in a portion of the outdoor liquid-refrigerant pipe 34 that is closer than a portion of the outdoor liquid-refrigerant pipe 34 to which the outdoor refrigerant cooler 45 is connected to the liquid-refrigerant connection pipe 5 (a portion between the outdoor refrigerant cooler 45 and the liquid-side shutoff valve 27).

The outdoor refrigerant-return pipe 41 is a refrigerant pipe that feeds refrigerant branched off from the outdoor liquid-refrigerant pipe 34 to the suction side of the compressor 21. The outdoor refrigerant-return pipe 41 mainly includes a refrigerant-return inlet pipe 42 and a refrigerant-return outlet pipe 43. The refrigerant-return inlet pipe 42 is a refrigerant pipe that branches a part of refrigerant flowing in the outdoor liquid-refrigerant pipe 34 from a portion between the liquid-side ends of the outdoor heat exchangers 23a and 23b and the liquid-pressure-adjusting expansion valve 26 (a portion between the outdoor expansion valves 25a and 25b and the outdoor refrigerant cooler 45) and that feeds the part of refrigerant to the inlet of the outdoor refrigerant cooler 45 on the outdoor refrigerant-return pipe 41 side. In the refrigerant-return inlet pipe 42, an outdoor refrigerant-return expansion valve 44, which adjusts the flow rate of refrigerant that flows through the outdoor refrigerant cooler 45 while decompressing refrigerant flowing through the outdoor refrigerant-return pipe 41, is disposed. The outdoor refrigerant-return expansion valve 44 is an electric expansion valve. The refrigerant-return outlet pipe 43 is a refrigerant pipe that feeds refrigerant to the suction refrigerant pipe 31 from an outlet of the outdoor refrigerant cooler 45 on the outdoor refrigerant-return pipe 41 side. The refrigerant-return outlet pipe 43 of the outdoor refrigerant-return pipe 41 is connected to a portion of the suction refrigerant pipe 31 on the inlet side of the accumulator 29. The outdoor refrigerant cooler 45 cools refrigerant flowing through the outdoor liquid-refrigerant pipe 34 by using refrigerant flowing through the outdoor refrigerant-return pipe 41.

A liquid injection pipe 46, which branches a part of refrigerant flowing through the outdoor liquid-refrigerant pipe 34 and feeds the part of refrigerant to the compressor 21, is connected to the outdoor liquid-refrigerant pipe 34. The liquid injection pipe 46 is connected to a portion of the outdoor liquid-refrigerant pipe 34 that is closer than the liquid-pressure-adjusting expansion valve 26 to the outdoor heat exchangers 23a and 23b. To be more specific, the liquid injection pipe 46 is connected to a portion of the outdoor liquid-refrigerant pipe 34 between the outdoor refrigerant cooler 45 and the liquid-pressure-adjusting expansion valve 26. Moreover, the liquid injection pipe 46 is connected to the suction refrigerant pipe 31 through which refrigerant to be sucked into the compressor 21 flows. The injection pipe 46 is connected to a portion of the suction refrigerant pipe 31 on the outlet side of the accumulator 29. In the liquid injection pipe 46, a liquid injection expansion valve 47, which decompresses refrigerant branched from the outdoor liquid-refrigerant pipe 34, is disposed. The liquid injection expansion valve 47 is an electric expansion valve.

The outdoor unit 2 includes various sensors. To be specific, the outdoor unit 2 includes a discharge pressure sensor 36 for detecting the pressure of refrigerant discharged from the compressor 21 (the discharge pressure Pd), a discharge temperature sensor 37 for detecting the temperature of refrigerant discharged from the compressor 21 (the discharge temperature Td), and a suction pressure sensor 39 for detecting the pressure of refrigerant to be sucked into the compressor 21 (the suction pressure Ps). The outdoor unit 2 further includes outdoor-heat-exchange liquid-side sensors 38a and 38b for detecting the temperature Tol of refrigerant at the liquid-side end of each of the outdoor heat exchangers 23a and 23b (the outdoor heat-exchange outlet temperature Tol); and a liquid pipe temperature sensor 49 for detecting the temperature of refrigerant in a portion of the outdoor liquid-refrigerant pipe 34 between the outdoor expansion valves 25a and 25b and the liquid-pressure-adjusting expansion valve 26 (the liquid pipe temperature Tlp).

<Relay Unit>

The relay units 4a, 4b, 4c, and 4d are set in indoor spaces in a building or the like, as with the indoor units 3a, 3b, 3c, and 3d. The relay units 4a, 4b, 4c, and 4d are interposed between the indoor units 3a, 3b, 3c, and 3d and the outdoor unit 2, as with the liquid-refrigerant connection pipe 5 and the gas-refrigerant connection pipe 6 (the high/low-pressure-gas-refrigerant connection pipe 7, the low-pressure-gas-refrigerant connection pipe 8, and the branch-pipe portions 6a, 6b, 6c, and 6d). The relay units 4a, 4b, 4c, and 4d constitute parts of the refrigerant circuit 10.

Next, the structures of the relay units 4a, 4b, 4c, and 4d will be described. Here, only the structure of the relay unit 4a will be described, because the structures of the relay unit 4a and the relay units 4b, 4c, and 4d are the same. Elements of the relay units 4b, 4c, and 4d will be denoted by attaching suffixes "b", "c" or "d", instead of "a" used for elements of the relay unit 4a, and descriptions thereof will be omitted.

The relay unit 4a mainly includes a liquid connection pipe 61a and a gas connection pipe 62a.

One end of the liquid connection pipe 61a is connected to the first branch-pipe portion 5a of the liquid-refrigerant connection pipe 5, and the other end of the liquid connection pipe 61a is connected to the second branch-pipe portion 5aa of the liquid-refrigerant connection pipe 5.

The gas connection pipe 62a includes a high-pressure gas connection pipe 63a that is connected to the branch-pipe portion 7a of the high/low-pressure-gas-refrigerant connection pipe 7, a low-pressure gas connection pipe 64a that is connected to the branch-pipe portion 8a of the low-pressure-gas-refrigerant connection pipe 8, and a junction gas-connection pipe 65a that joins the high-pressure gas connection pipe 63a and the low-pressure gas connection pipe 64a. The junction gas-connection pipe 65a is connected to the branch-pipe portion 6a of the gas-refrigerant connection pipe 6. A high-pressure relay gas valve 66a is disposed in the high-pressure gas connection pipe 63a, and a low-pressure relay gas valve 67a is disposed in the low-pressure gas connection pipe 64a. The high-pressure relay gas valve 66a and the low-pressure relay gas valve 67a are electric expansion valves.

When the indoor unit 3a performs cooling operation, the relay unit 4a can function as follows: the relay unit 4a opens the low-pressure relay gas valve 67a to feed refrigerant, which flows into the liquid connection pipe 61a through the first branch-pipe portion 5a of the liquid-refrigerant connection pipe 5, to the indoor unit 3a through the second branch-pipe portion 5aa of the liquid-refrigerant connection pipe 5; and, subsequently, the relay unit 4a returns refrigerant, which has evaporated by exchanging heat with indoor air in the indoor heat exchanger 52a, to the branch-pipe portion 8a of the low-pressure gas connection pipe 8 through the branch-pipe portion 6a of the gas-refrigerant connection pipe 6, the junction gas-connection pipe 65a, and the low-pressure gas connection pipe 64a. When the indoor unit 3a performs heating operation, the relay unit 4a can function as follows: the relay unit 4a closes the low-pressure relay gas valve 67a and opens the high-pressure relay gas valve 66a to feed refrigerant, which flows into the high-pressure gas connection pipe 63a and the junction gas-connection pipe 65a through the branch-pipe portion 7a of the high/low-pressure-gas-refrigerant connection pipe 7, to the indoor unit 3a through the branch-pipe portion 6a of the gas-refrigerant connection pipe 6; and, subsequently, the relay unit 4a returns refrigerant, which has released heat by exchanging heat with indoor air in the indoor heat exchanger 52a, to the first branch-pipe portion 5a of the liquid-refrigerant connection pipe 5 through the second branch-pipe portion 5aa of the liquid-refrigerant connection pipe 5. In this way, the high-pressure relay gas valve 66a and the low-pressure relay gas valve 67a are opened and closed when switching the indoor heat exchanger 52a so that the indoor heat exchanger 52a functions as an evaporator for refrigerant or a radiator for refrigerant. Not only the relay unit 4a but also the relay units 4b, 4c, and 4d have the same function. Therefore, the relay units 4a, 4b, 4c, and 4d can switch the indoor heat exchangers 52a, 52b, 52c, and 52d so that the indoor heat exchangers 52a, 52b, 52c, and 52d individually function as an evaporator for refrigerant or a radiator for refrigerant.

The relay unit 4a includes a relay expansion valve 71a that further decompresses refrigerant that has been decompressed by the liquid-pressure-adjusting expansion valve 26 when the indoor unit 3a performs cooling operation. The relay expansion valve 71a is an electric expansion valve disposed in the liquid connection pipe 61a. The relay expansion valve 71a decompresses refrigerant that has released heat in the indoor heat exchanger 52a in heating only operation and heating main operation, in each of which the indoor unit 3a performs heating operation.

<Control Unit>

The control unit 19 includes a control board and the like (not shown), which are included in the outdoor unit 2, the indoor units 3a, 3b, 3c, and 3d, and the relay units 4a, 4b, 4c, and 4d and which are connected to each other by communication lines. In FIG. 1, for convenience of drawing, the control unit 19 is shown at a position that is separated from the outdoor unit 2, the indoor units 3a, 3b, 3c, and 3d, and the relay units 4a, 4b, 4c, and 4d. The control unit 19 controls the components 21, 22a to 22c, 24, 25a, 25b, 26, 41, 47, 51a to 51d, 55a to 55d, 66a to 66d, 67a to 67d, 71a to 71d of the air conditioner 1 (the outdoor unit 2, the indoor units 3a, 3b, 3c, and 3d, and the relay units 4a, 4b, 4c, and 4d) on the basis of detection signals of the aforementioned sensors 36, 37, 38, 39, 49, 57a to 57d, 58a to 58d, and 59a to 59d, and the like. That is, the control unit 19 controls operations of the entirety of the air conditioner 1.

(2) Operations and Features of Air Conditioner

Next, the operations and features of the air conditioner 1 will be described with reference to FIGS. 1 to 6.

As described above, the operations of the air conditioner 1 include cooling only operation, heating only operation, cooling main operation, and heating main operation.

In cooling operation and cooling main operation, the air conditioner 1 performs two-phase transport of refrigerant, with which refrigerant in a gas-liquid two-phase state is fed from the outdoor unit 2 to the indoor units 3a and 3b through the liquid-refrigerant connection pipe 5 by using the liquid-pressure-adjusting expansion valve 26 disposed in the outdoor liquid-refrigerant pipe 34. In cooling only operation and cooling main operation, the air conditioner 1 performs an operation of suppressing variation of the temperature of refrigerant (liquid pipe temperature Tlp) in a portion of the outdoor liquid-refrigerant pipe 34 between the outdoor refrigerant cooler 45 and the liquid-pressure-adjusting expansion valve 26 by using the following components: the outdoor refrigerant-return pipe 41, which branches a part of refrigerant flowing through the outdoor liquid-refrigerant pipe 34 and feeds the part of refrigerant to the compressor 21; and the outdoor refrigerant cooler 45, which cools refrigerant flowing through a portion of the outdoor liquid-refrigerant pipe 34 that is closer than the liquid-pressure-adjusting expansion valve 26 to the outdoor heat exchanger 23 by using refrigerant flowing through the outdoor refrigerant-return pipe 41. In cooling operation and cooling main operation, the air conditioner 1 performs an operation of suppressing increase in the temperature of refrigerant discharged from the compressor 21 (discharge temperature Td) by using the liquid injection pipe 46, which branches a part of refrigerant flowing through a portion of the outdoor liquid-refrigerant pipe 34 that is closer than the liquid-pressure-adjusting expansion valve 26 to the outdoor refrigerant cooler 45 and which feeds the part of refrigerant to the compressor 21. In cooling only operation and cooling main operation, the air conditioner 1 performs an operation of further decompressing refrigerant that has been decompressed by the liquid-pressure-adjusting expansion valve 26 by using a relay expansion valve corresponding to an indoor unit that performs cooling operation. In heating only operation and heating main operation, the air conditioner 1 performs an operation of decompressing refrigerant that has released heat in an indoor heat exchanger of an indoor unit that performs heating operation by using a relay expansion valve corresponding to an indoor unit that performs heating operation.

The operations of the air conditioner 1 described below are performed by the control unit 19, which controls the components of the air conditioner 1.

<Cooling Only Operation>

When performing cooling only operation, for example, when all the indoor units 3a, 3b, 3c, and 3d perform cooling operation (that is, all the indoor heat exchangers 52a, 52b, 52c, and 52d function as evaporators for refrigerant and the outdoor heat exchangers 23a and 23b function as radiators for refrigerant), the switching mechanisms 22a and 22b are switched to outdoor radiator states (shown by solid lines in the switching mechanisms 22a and 22b in FIG. 1) and the compressor 21, the outdoor fan 24, and the indoor fans 55a, 55b, 55c, and 55d are driven. The third switching mechanism 22c is switched to a refrigerant inflow state (shown by solid lines in the switching mechanism 22c in FIG. 1), and the high-pressure relay gas valves 66a, 66b, 66c, and 66d and the low-pressure relay gas valves 67a, 67b, 67c, and 67d of the relay units 4a, 4b, 4c, and 4d are opened.

Figure 2:
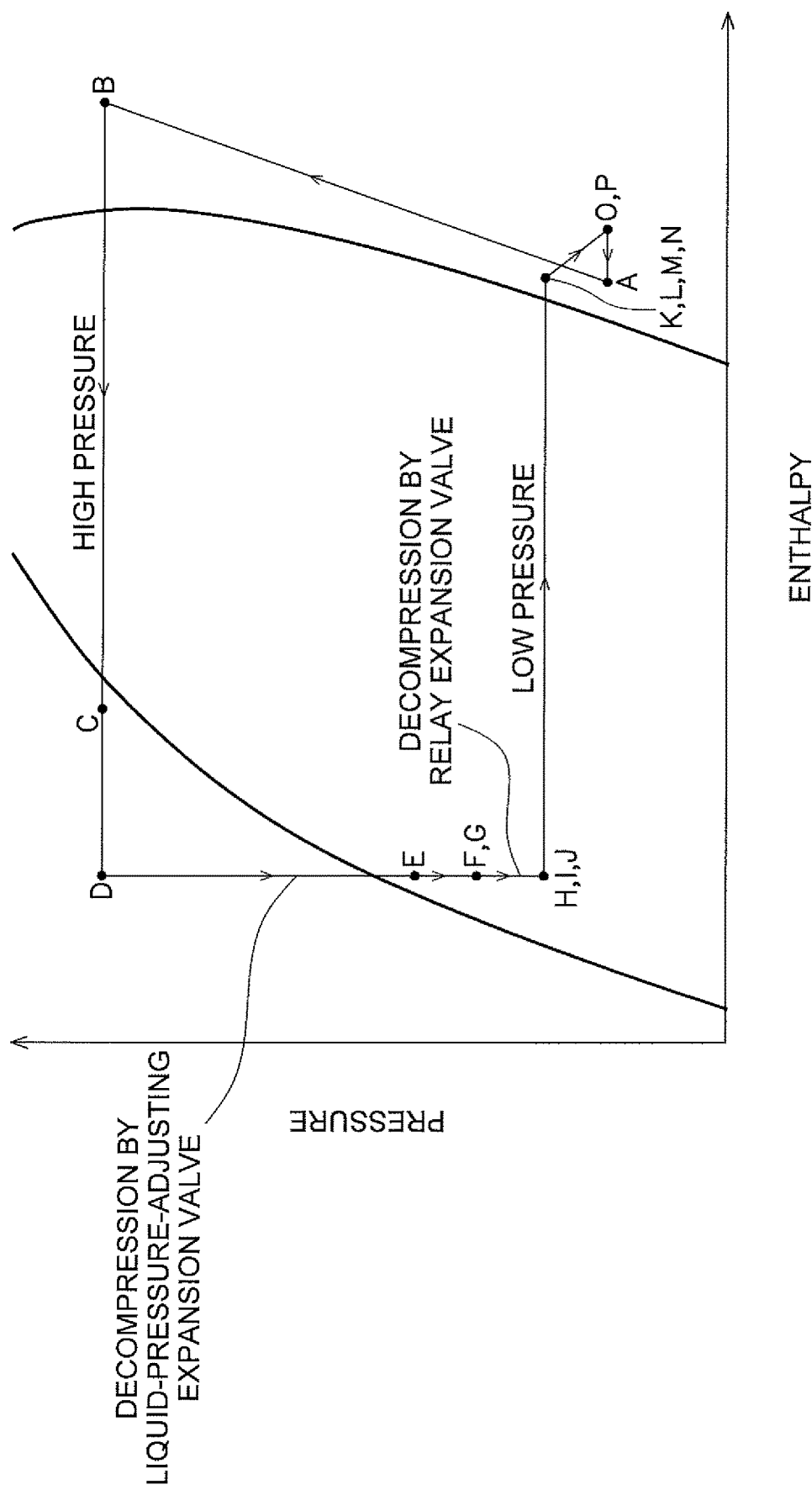
FIG. 2 is a pressure-enthalpy diagram illustrating a refrigeration cycle during cooling only operation of the air conditioner according to the embodiment of the present invention.

Then, high-pressure refrigerant discharged from the compressor 21 is fed to the outdoor heat exchangers 23a and 23b through the switching mechanisms 22a and 22b (see the point B in FIGS. 1 and 2). The refrigerant fed to the outdoor heat exchangers 23a and 23b is cooled and condensed in the outdoor heat exchangers 23a and 23b, which function as radiators for refrigerant, by exchanging heat with outdoor air supplied by the outdoor fan 24 (see the points C in FIGS. 1 and 2). The refrigerant flows through the outdoor expansion valves 25a and 25b, the outdoor refrigerant cooler 45, the liquid-pressure-adjusting expansion valve 26, and the liquid-side shutoff valve 27; and the refrigerant flows out of the outdoor unit 2 (see the point E in FIGS. 1 and 2).

The refrigerant flowed out of the outdoor unit 2 branches through the liquid-refrigerant connection pipe 5 (the junction pipe portion and the first branch-pipe portions 5a, 5b, 5c, and 5d) and flows into the relay units 4a, 4b, 4c, and 4d (see the point F in FIGS. 1 and 2). The refrigerants fed to the relay units 4a, 4b, 4c, and 4d are decompressed by the relay expansion valves 71a, 71b, 71c, and 71d to low pressure. The refrigerants flow out of the relay units 4a, 4b, 4c, and 4d (see the points H in FIGS. 1 and 2).

The refrigerants flowed out of the relay units 4a, 4b, 4c, and 4d are fed to the indoor units 3a, 3b, 3c, and 3d (see the points I in FIGS. 1 and 2) through the second branch-pipe portions 5aa, 5bb, 5cc, and 5dd (portions of the liquid-refrigerant connection pipe 5 that connect the relay units 4a, 4b, 4c, and 4d and the indoor units 3a, 3b, 3c, and 3d). The refrigerants fed to the indoor units 3a, 3b, 3c, and 3d are fed to the indoor heat exchangers 52a, 52b, 52a, and 52b through the indoor expansion valves 51a, 51b, 51c, and 51d, which are fully opened (see the points J in FIGS. 1 and 2). The refrigerants fed to the indoor heat exchangers 52a, 52b, 52c, and 52d are heated and evaporated in the indoor heat exchangers 52a, 52b, 52c, and 52d, which function as evaporators for refrigerant, by exchanging heat with indoor air supplied from indoor spaces by the indoor fans 55a, 55b, 55c, and 55d (see the points K in FIGS. 1 and 2). The refrigerants flow out of the indoor units 3a, 3b, 3c, and 3d. The indoor air cooled in the indoor heat exchangers 52a, 52b, 52c, and 52d is fed to the indoor spaces, thereby cooling the indoor spaces.

The refrigerants flowed out of the indoor units 3a, 3b, 3c, and 3d are fed to the relay units 4a, 4b, 4c, and 4d through the branch-pipe portions 6a, 6b, 6c, and 6d of the gas-refrigerant connection pipe 6 (see the points L in FIGS. 1 and 2). The refrigerants fed to the relay units 4a, 4b, 4c, and 4d flow out of the relay units 4a, 4b, 4c, and 4d through the high-pressure relay gas valves 66a, 66b, 66c, and 66d and the low-pressure relay gas valves 67a, 67b, 67c, and 67d (see the points M and N in FIGS. 1 and 2).

The refrigerants flowed out of the relay units 4a, 4b, 4c, and 4d are joined and fed to the outdoor unit 2 (see the points O and P in FIGS. 1 and 2) through the high/low-pressure-gas-refrigerant connection pipe 7 (the junction pipe portion and the branch-pipe portions 7a, 7b, 7c, and 7d) and the low-pressure-gas-refrigerant connection pipe 8 (the junction pipe portion and the branch-pipe portions 8a, 8b, 8c, and 8d). The refrigerant fed to the outdoor unit 2 is sucked into the compressor 21 through the gas-side shutoff valves 28a and 28b, the third switching mechanism 22c, and the accumulator 29 (see the point A in FIGS. 1 and 2).

When performing the cooling only operation, the air conditioner 1 performs two-phase transport of refrigerant, with which refrigerant in a gas-liquid two-phase state is fed from the outdoor unit 2 to the indoor units 3a and 3b through the liquid-refrigerant connection pipe 5 by using the liquid-pressure-adjusting expansion valve 26. Moreover, variation in the liquid pipe temperature Tlp in a portion of the outdoor liquid-refrigerant pipe 34 between the outdoor refrigerant cooler 45 and the liquid-pressure-adjusting expansion valve 26 is suppressed by cooling refrigerant flowing through the outdoor liquid-refrigerant pipe 34 by using the outdoor refrigerant-return pipe 41 and the outdoor refrigerant cooler 45; and increase in the discharge temperature Td of the compressor 21 is suppressed by using the liquid injection pipe 46. Thus, two-phase transport of refrigerant can be smoothly performed. Furthermore, the refrigerant in a gas-liquid two-phase state, which has been decompressed by the liquid-pressure-adjusting expansion valve 26, is further decompressed by using the relay expansion valves 71a, 71b, 71c, and 71d, and fed to the indoor units 3a, 3b, 3c, and 3d.

First, the control unit 19 causes the liquid-pressure-adjusting expansion valve 26 to decompress refrigerant flowing through the liquid-refrigerant connection pipe 5 so that the refrigerant enters a gas-liquid two-phase state (see the points D and E in FIGS. 1 and 2). The refrigerant, which has been decompressed by the liquid-pressure-adjusting expansion valve 26, is intermediate-pressure refrigerant whose pressure is lower than that of high-pressure refrigerant and higher than that of low-pressure refrigerant (see the point E in FIGS. 1 and 2). The control unit 19 controls the opening degree of the liquid-pressure-adjusting expansion valve 26 so that the degree of subcooling SCo of refrigerant at the liquid-side end of the outdoor heat exchanger 23 becomes a target degree of subcooling SCot. To be specific, the control unit 19 obtains the degree of subcooling SCo of refrigerant at the liquid-side end of the outdoor heat exchanger 23 from the outdoor heat-exchange liquid-side temperature Tol. The control unit 19 obtains the degree of subcooling SCo of refrigerant at the liquid-side end of the outdoor heat exchanger 23 by subtracting the outdoor heat-exchange outlet temperature Tol from the temperature of refrigerant Toc obtained by converting the discharge pressure Pd into a saturation temperature. If the degree of subcooling SCo is larger than the target degree of subcooling Scot, the control unit 19 performs control to increase the opening degree of the liquid-pressure-adjusting expansion valve 26. If the degree of subcooling SCo is smaller than the target degree of subcooling Scot, the control unit 19 performs control to decrease the opening degree of the liquid-pressure-adjusting expansion valve 26. At this time, the control unit 19 performs control to fix the opening degrees of the outdoor expansion valves 25a and 25b in fully open states.

Due to this control, refrigerant flowing through the liquid-refrigerant connection pipe 5 enters a gas-liquid two-phase state. Therefore, compared with a case where refrigerant flowing through the liquid-refrigerant connection pipe 5 is in a liquid state, the liquid-refrigerant connection pipe 5 is less likely to be filled with refrigerant in a liquid state, and thereby the amount of refrigerant that exists in the liquid-refrigerant connection pipe 5 can be reduced.

The control unit 19 maintains the temperature of refrigerant (liquid pipe temperature Tlp) in a portion of the outdoor liquid-refrigerant pipe 34 between the outdoor refrigerant cooler 45 and the liquid-pressure-adjusting expansion valve 26 at a constant temperature by causing the outdoor refrigerant cooler 45 to cool refrigerant flowing in a portion of the outdoor liquid-refrigerant pipe 34 that is closer than the liquid-pressure-adjusting expansion valve 26 to the outdoor heat exchanger 23 by using refrigerant flowing through the outdoor refrigerant-return pipe 41. The control unit 19 controls the opening degree of the outdoor refrigerant-return expansion valve 44 so that the temperature of refrigerant (the liquid pipe temperature Tlp) in the portion of the outdoor liquid-refrigerant pipe 34 between the outdoor refrigerant cooler 45 and the liquid-pressure-adjusting expansion valve 26 becomes a target liquid pipe temperature Tlpt. To be specific, if the liquid pipe temperature Tlp is higher than the target liquid pipe temperature Tlpt, the control unit 19 performs control to increase the opening degree of the outdoor refrigerant-return expansion valve 44. If the liquid pipe temperature Tlp is lower than the target liquid pipe temperature Tlpt, the control unit 19 performs control to reduce the opening degree of the outdoor refrigerant-return expansion valve 44.

Due to this control, the temperature of refrigerant (liquid pipe temperature Tlp) in the portion of the outdoor liquid-refrigerant pipe 34 between the outdoor refrigerant cooler 45 and the liquid-pressure-adjusting expansion valve 26 can be maintained constant at the target liquid pipe temperature Tlpt (see the points J in FIGS. 1 and 2). By maintaining the liquid pipe temperature Tlp constant and suppressing variation, refrigerant that has been decompressed by the liquid-pressure-adjusting expansion valve 26 and that flows through the liquid-refrigerant connection pipe 5 can be reliably maintained in a desirable gas-liquid two-phase state (see the point E in FIG. 2).

Moreover, the control unit 19 branches a part of refrigerant flowing through the outdoor liquid-refrigerant pipe 34 and feeds the part of refrigerant to the compressor 21 (the suction refrigerant pipe 31 connected to the suction side of the compressor 21) so as to suppress increase in the discharge temperature Td of the compressor 21. The control unit 19 controls the opening degree of the liquid injection expansion valve 47 so that the discharge temperature Td of the compressor 21 does not exceed an upper limit discharge temperature Tdx. To be specific, if the discharge temperature Td rises above the upper limit discharge temperature Tdx, the control unit 19 performs control to increase the opening degree of the liquid injection expansion valve 47 until the discharge temperature Td becomes lower than or equal to the upper limit discharge temperature Tdx.

Due to this control, refrigerants fed to the outdoor unit 2 (the points O and P in FIGS. 1 and 2) from the indoor units 3a, 3b, 3c, and 3d through the relay units 4a, 4b, 4c, and 4d are cooled by joining with refrigerant fed to the compressor 21 through the liquid injection pipe 46 (see the points O, P, and A in FIGS. 1 and 2). Therefore, in accordance with the degree to which the refrigerants are cooled, increase in the discharge temperature Td of the compressor 21 can be suppressed (see the point B in FIGS. 1 and 2).

The control unit 19 controls the opening degrees of the relay expansion valves 71a, 71b, 71c, and 71d so that the degree of superheating SHr of refrigerant at the gas-side end of each of the indoor heat exchangers 52a, 52b, 52c, and 52d becomes a target degree of superheating SHrt. To be specific, the control unit 19 obtains the degree of superheating SHr of refrigerant at the gas-side end of each of the indoor heat exchangers 52a, 52b, 52c, and 52d by subtracting the indoor-heat-exchange liquid-side temperature Trl from the indoor-heat-exchange gas-side temperature Trg. If the degree of superheating SHr is larger than the target degree of superheating SHrt, the control unit 19 performs control to increase the opening degrees of the relay expansion valves 71a, 71b, 71c, and 71d. If the degree of superheating SHr is smaller than the target degree of superheating SHrt, the control unit 19 performs control to reduce the opening degrees of the relay expansion valves 71a, 71b, 71c, and 71d. At this time, the control unit 19 performs control to fix the opening degrees of the indoor expansion valves 51a, 51b, 51c, and 51d in fully open states.

Due to this control, an operation of decompressing the refrigerant in a gas-liquid two-phase state, which has been decompressed by the liquid-pressure-adjusting expansion valve 26, to low pressure (see the points F, G, H, I, and J in FIGS. 1 and 2) can be performed by using the relay expansion valves 71a, 71b, 71c, and 71d of the relay units 4a, 4b, 4c, and 4d. Therefore, refrigerant passing noise, which may be generated when the refrigerant in a gas-liquid two-phase state flows into the expansion valve, can be prevented from being generated in the indoor units 3a, 3b, 3c, and 3d.

Thus, in the structure including the liquid-pressure-adjusting expansion valve 26, generation of noise from the indoor units 3a, 3b, 3c, and 3d can be suppressed by providing the relay units 4a, 4b, 4c, and 4d with the relay expansion valves 71a, 71b, 71c, and 71d and by decompressing refrigerant in a gas-liquid two-phase state that has been decompressed by the liquid-pressure-adjusting expansion valve 26.

<Heating Only Operation>

Figure 3:
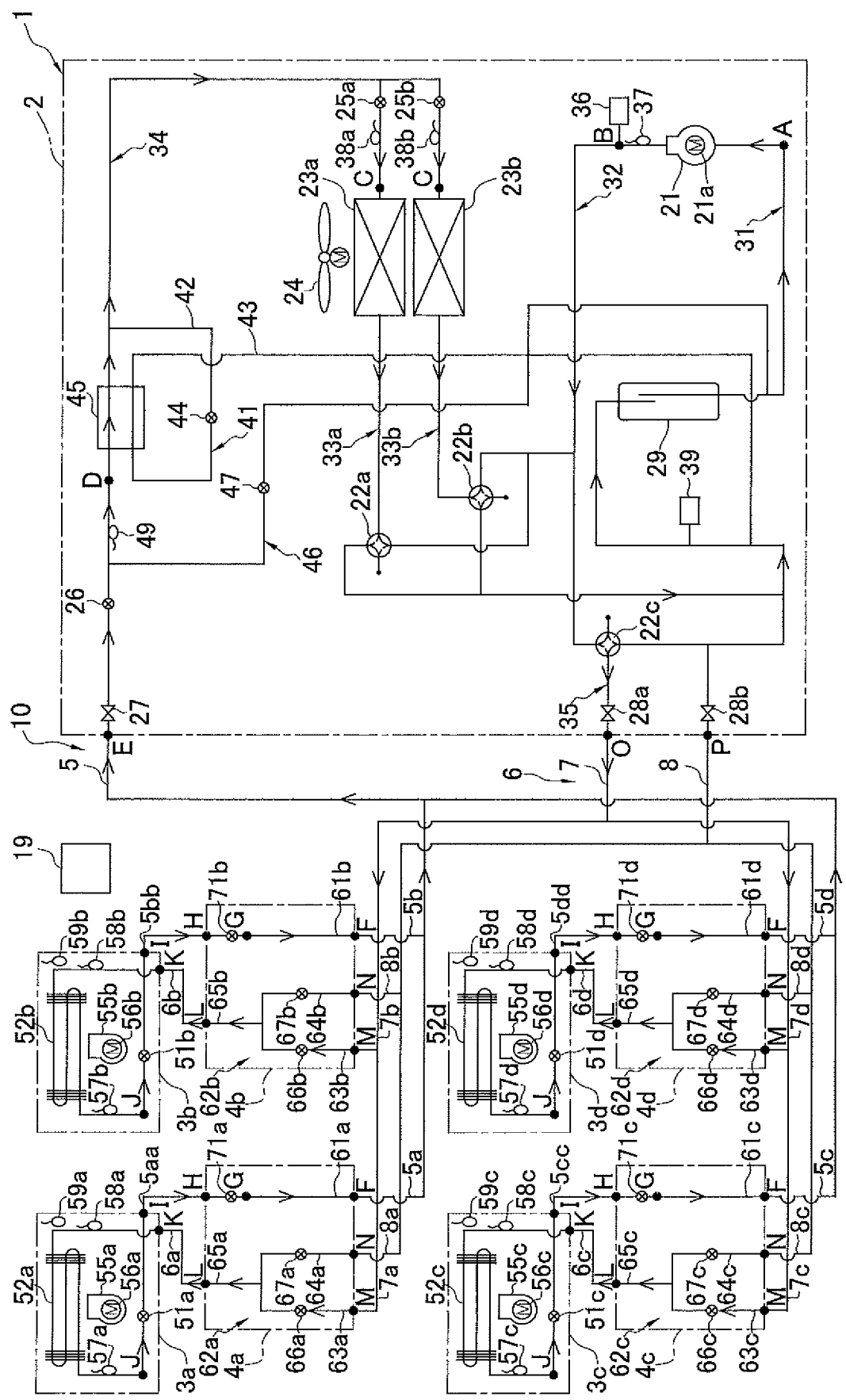
FIG. 3 illustrates flow of refrigerant during heating only operation of the air conditioner according to the embodiment of the present invention.

When performing heating only operation, for example, when all the indoor units 3a, 3b, 3c, and 3d perform heating operation (that is, all the indoor heat exchangers 52a, 52b, 52c, and 52d function as radiators for refrigerant and the outdoor heat exchangers 23a and 23b function as evaporators for refrigerant), the switching mechanisms 22a and 22b are switched to outdoor evaporator states (shown by broken lines in the switching mechanisms 22a and 22b in FIG. 3) and the compressor 21, the outdoor fan 24, and the indoor fans 55a, 55b, 55c, and 55d are driven. The third switching mechanism 22c is switched to a refrigerant outflow state (shown by broken lines in the switching mechanism 22c in FIG. 3), the high-pressure relay gas valves 66a, 66b, 66c, and 66d of the relay units 4a, 4b, 4c, and 4d are opened, and the low-pressure relay gas valves 67a, 67b, 67c, and 67d of the relay units 4a, 4b, 4c, and 4d are closed.

Figure 4:
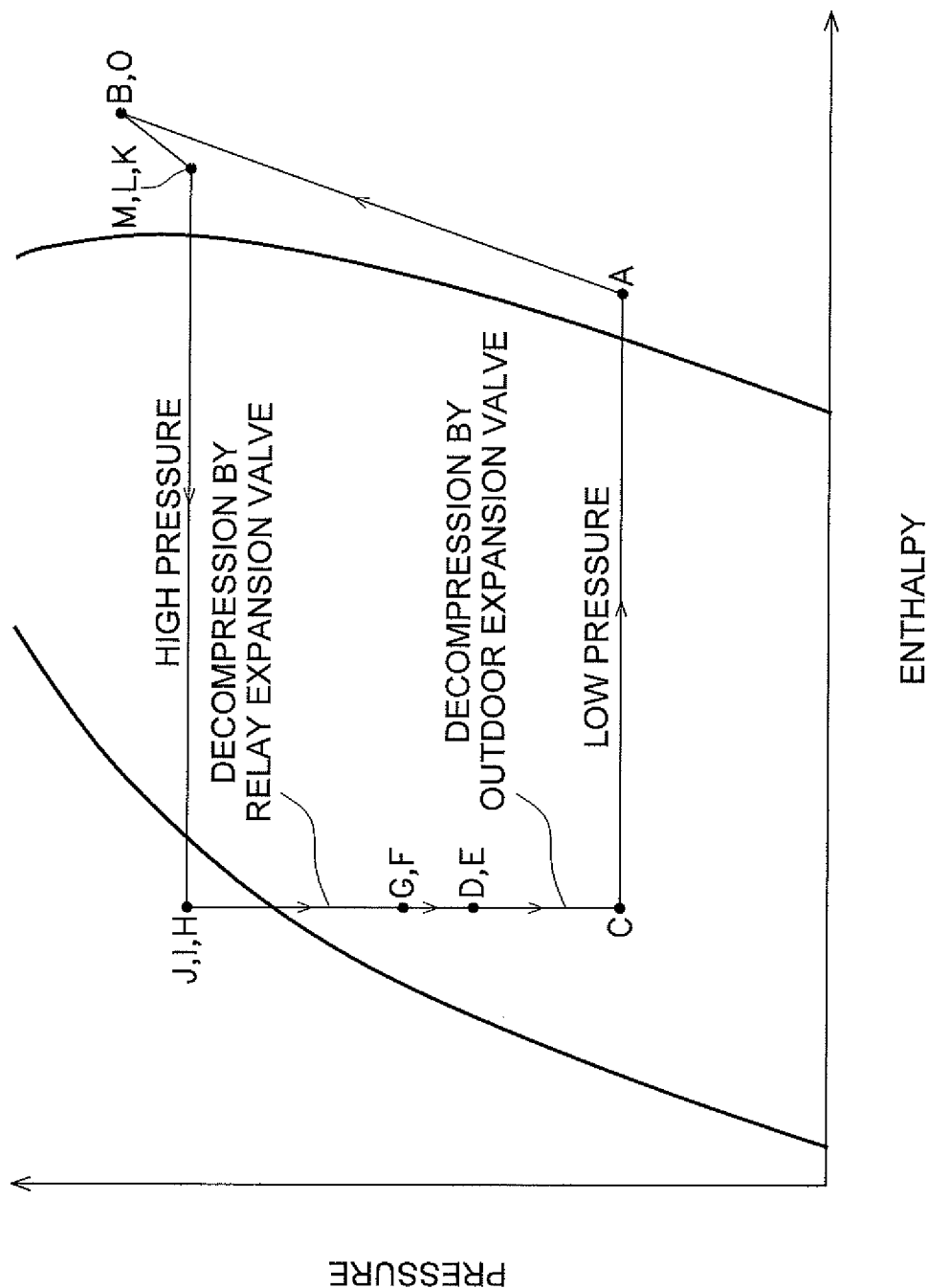
FIG. 4 is a pressure-enthalpy diagram illustrating a refrigeration cycle during heating only operation of the air conditioner according to the embodiment of the present invention.

Then, high-pressure refrigerant discharged from the compressor 21 flows out of the outdoor unit 2 through the third switching mechanism 22c and the gas-side shutoff valve 28a (see the points B and O in FIGS. 3 and 4).

The refrigerant flowed out of the outdoor unit 2 branches through the gas-refrigerant connection pipe 6 (the junction pipe portion of the high/low-pressure-gas-refrigerant connection pipe 7 and the branch-pipe portions 7a, 7b, 7c, and 7d) and is fed to the relay units 4a, 4b, 4c, and 4d (see the points M in FIGS. 3 and 4). The refrigerants fed to the relay units 4a, 4b, 4c, and 4d flow out of the relay units 4a, 4b, 4c, and 4d through the high-pressure relay gas valves 66a, 66b, 66c, and 66d (see the points L in FIGS. 3 and 4).

The refrigerants flowed out of the relay units 4a, 4b, 4c, and 4d are fed to the indoor units 3a, 3b, 3c, and 3d (see the points K in FIGS. 3 and 4) through the branch-pipe portions 6a, 6b, 6c, and 6d (portions of the gas-refrigerant connection pipe 6 that connect the relay units 4a, 4b, 4c, and 4d and the indoor units 3a, 3b, 3c, and 3d). The refrigerants fed to the indoor units 3a, 3b, 3c, and 3d are fed to the indoor heat exchangers 52a, 52b, 52c, and 52d. The high-pressure refrigerants fed to the indoor heat exchangers 52a, 52b, 52c, and 52d are cooled and condensed in the indoor heat exchangers 52a, 52b, 52c, and 52d, which function as radiators for refrigerant, by exchanging heat with indoor air supplied by the indoor fans 55a, 55b, 55c, and 55d (see the points J in FIGS. 3 and 4). The refrigerants flow out of the indoor units 3a, 3b, 3c, and 3d through the indoor expansion valves 51a, 51b, 51c, and 51d, which are fully opened (see the points I in FIGS. 3 and 4). The indoor air heated in the indoor heat exchangers 52a, 52b, 52c, and 52d is fed to the indoor spaces, thereby heating the indoor spaces.

The refrigerants flowed out of the indoor units 3a, 3b, 3c, and 3d are fed to the relay units 4a, 4b, 4c, and 4d (see the points H in FIGS. 3 and 4) through the second branch-pipe portions 5aa, 5bb, 5cc, and 5dd (portions of the liquid-refrigerant connection pipe 5 that connect the relay units 4a, 4b, 4c, and 4d and the indoor units 3a, 3b, 3c, and 3d). The refrigerants fed to the relay units 4a, 4b, 4c, and 4d are decompressed by the relay expansion valves 71a, 71b, 71c, and 71d (see the points G in FIGS. 3 and 4). The refrigerants flow out of the relay units 4a, 4b, 4c, and 4d (see the points F in FIGS. 3 and 4).

The refrigerants flowed out of the relay units 4a, 4b, 4c, and 4d are joined and fed to the outdoor unit 2 (see the point E in FIGS. 3 and 4) through the liquid-refrigerant connection pipe 5 (the junction pipe portion and the first branch-pipe portions 5a, 5b, 5c, and 5d). The refrigerant fed to the outdoor unit 2 is fed to the outdoor expansion valves 25a and 25b through the liquid-side shutoff valve 27, the liquid-pressure-adjusting expansion valve 26, and the outdoor refrigerant cooler 45 (see the point D in FIGS. 3 and 4). The refrigerants fed to the outdoor expansion valves 25a and 25b are decompressed to low pressure by the outdoor expansion valves 25a and 25b, and then fed to the outdoor heat exchangers 23a and 23b (see the pongs C in FIGS. 3 and 4). The refrigerants fed to the outdoor heat exchangers 23a and 23b are heated and evaporated by exchanging heat with outdoor air supplied by the outdoor fan 24 (see the point A in FIGS. 3 and 4). The refrigerants are sucked into the compressor 21 through the switching mechanisms 22a and 22b and the accumulator 29.

The control unit 19 controls the opening degrees of the relay expansion valves 71a, 71b, 71c, and 71d so that the degree of subcooling SCr of refrigerant at the liquid-side end of each of the indoor heat exchangers 52a, 52b, 52c, and 52d becomes a target degree of subcooling SCrt. To be specific, the control unit 19 obtains the degree of subcooling SCr of refrigerant at the liquid-side end of each of the indoor heat exchangers 52a, 52b, 52c, and 52d from the indoor-heat-exchange liquid-side temperature Trl. The control unit 19 obtains the degree of subcooling SCr of refrigerant at the liquid-side end of each of the indoor heat exchangers 52a, 52b, 52c, and 52d by subtracting the indoor-heat-exchange liquid-side temperature Trl from the temperature of refrigerant Trc that is obtained by converting the discharge pressure Pd into a saturation temperature. If the degree of subcooling SCr is smaller than the target degree of subcooling SCrt, the control unit 19 performs control to decrease the opening degrees of the relay expansion valves 71a, 71b, 71c, and 71d. If the degree of subcooling SCr is larger than the target degree of subcooling SCrt, the control unit 19 performs control to increase the opening degrees of the relay expansion valves 71a, 71b, 71c, and 71d.

Moreover, the control unit 19 performs control to fix the opening degree of the liquid-pressure-adjusting expansion valve 26 in a fully open state and to cause the opening degrees of the outdoor refrigerant-return expansion valve 44 and the liquid injection expansion valve 47 to be in fully closed states so as not to feed refrigerant to the outdoor refrigerant-return pipe 41 and the liquid injection pipe 46.

<Cooling Main Operation>

Figure 5:
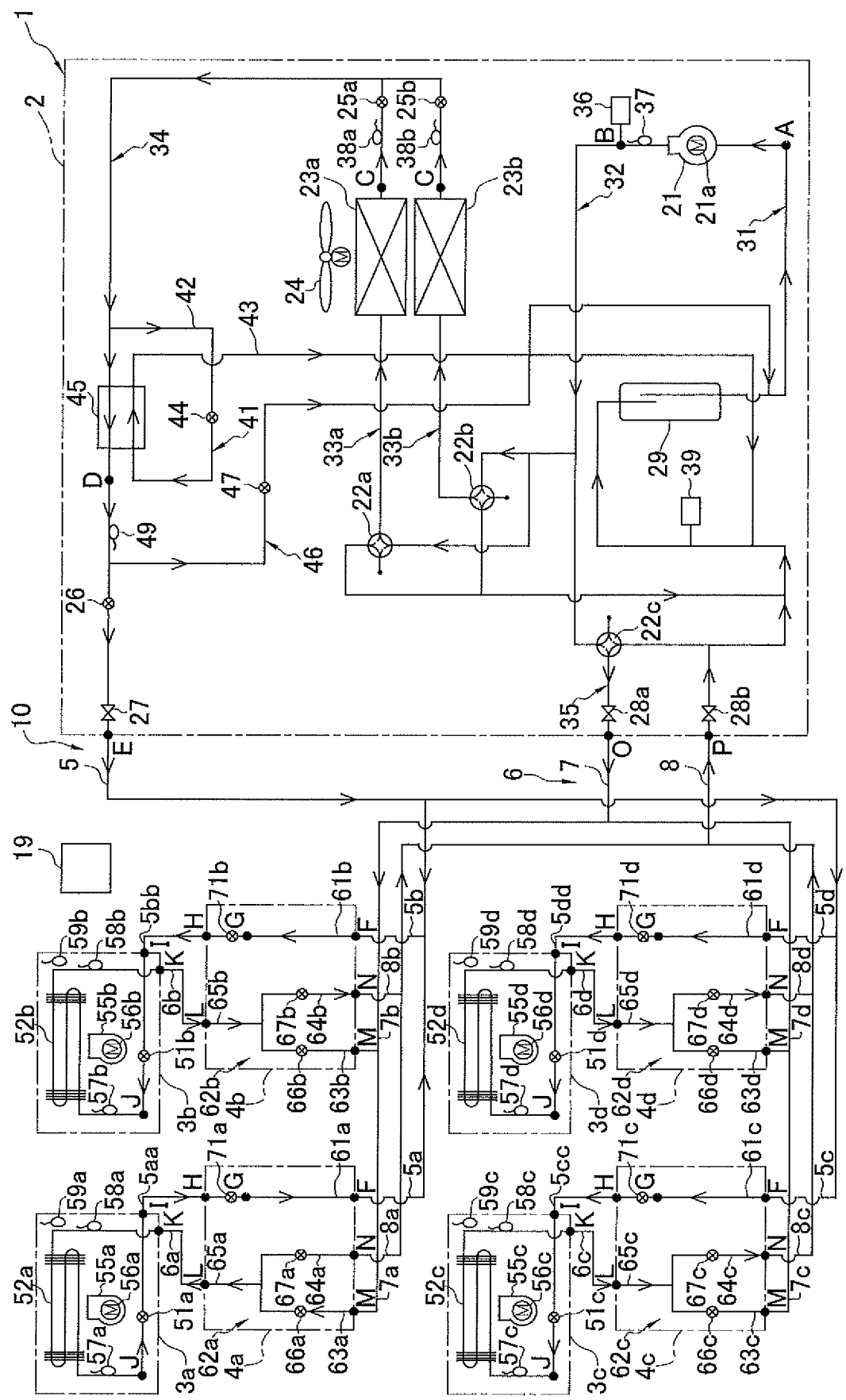
FIG. 5 illustrates flow of refrigerant during cooling main operation of the air conditioner according to the embodiment of the present invention.

When performing cooling main operation, for example, when the indoor units 3b, 3c, and 3d perform cooling operation and the indoor unit 3a performs heating operation (that is, the indoor heat exchangers 52b, 52c, and 52d function as evaporators for refrigerant and the indoor heat exchanger 52a functions as a radiator for refrigerant) and the outdoor heat exchangers 23a and 23b function as radiators for refrigerant, the switching mechanisms 22a and 22b are switched to outdoor radiator states (shown by solid lines in the switching mechanisms 22a and 22b in FIG. 5) and the compressor 21, the outdoor fan 24, and the indoor fans 55a, 55b, 55c, and 55d are driven. The third switching mechanism 22c is switched to a refrigerant outflow state (shown by broken lines in the switching mechanism 22c in FIG. 5), the high-pressure relay gas valve 66a of the relay unit 4a and the low-pressure relay gas valves 67b, 67c, and 67d of the relay units 4b, 4c, and 4d are opened, and the low-pressure relay gas valve 67a of the relay unit 4a and the high-pressure relay gas valves 66b, 66c, and 66d of the relay units 4b, 4c, and 4d are closed.

Then, a part of high-pressure refrigerant discharged from the compressor 21 is fed to the outdoor heat exchangers 23a and 23b through the switching mechanisms 22a and 22b, and the remaining part of the refrigerant flows out of the outdoor unit 2 through the third switching mechanism 22c and the gas-side shutoff valve 28a (see the points B and O in FIG. 5). The refrigerant fed to the outdoor heat exchangers 23a and 23b is cooled and condensed in the outdoor heat exchangers 23a and 23b, which function as radiators for refrigerant, by exchanging heat with outdoor air supplied by the outdoor fan 24 (see the points C in FIG. 5). The refrigerant flows out of the outdoor unit 2 through the outdoor expansion valves 25a and 25b, the outdoor refrigerant cooler 45, the liquid-pressure-adjusting expansion valve 26, and the liquid-side shutoff valve 27 (see the point E in FIG. 5).

The refrigerant flowed out of the outdoor unit 2 through the third switching mechanism 22c and the like is fed to the relay unit 4a (see the point M in FIG. 5) through the gas-refrigerant connection pipe 6 (the junction pipe portion and the branch-pipe portion 7a of the high/low-pressure-gas-refrigerant connection pipe 7). The refrigerant fed to the relay unit 4a flows out of the relay unit 4a through the high-pressure relay gas valve 66a (see the point L in FIG. 5).

The refrigerant flowed out of the relay unit 4a is fed to the indoor unit 3a (see the point K in FIG. 5) through the branch-pipe portion 6a (a portion of the gas-refrigerant connection pipe 6 that connects the relay unit 4a and the indoor unit 3a). The refrigerant fed to the indoor unit 3a is fed to the indoor heat exchanger 52a. The high-pressure refrigerant fed to the indoor heat exchanger 52a is cooled and condensed in the indoor heat exchanger 52a, which functions as a radiator for refrigerant, by exchanging heat with indoor air supplied from an indoor space by the indoor fan 55a (see the point J in FIG. 5). The refrigerant flows out of the indoor unit 3a through the indoor expansion valve 51a, which is fully opened (see the point I in FIG. 5). The indoor air heated in the indoor heat exchanger 52a is fed to the indoor space, thereby heating the indoor space.

The refrigerant flowed out of the indoor unit 3a is fed to the relay unit 4a (see the point H in FIG. 5) through the second branch-pipe portion 5aa (a portion of the liquid-refrigerant connection pipe 5 that connects the relay unit 4a and the indoor unit 3a). The refrigerant fed to the relay unit 4a is decompressed by the relay expansion valve 71a (see the point G in FIG. 5). The refrigerant flows out of the relay unit 4a (see the point F in FIG. 5).

The refrigerant flowed out of the relay unit 4a is fed to the junction pipe portion of the liquid-refrigerant connection pipe 5 through the first branch-pipe portion 5a, and joins refrigerant flowed out of the outdoor unit 2 through the outdoor heat exchangers 23a and 23b. The refrigerant branches through the first branch-pipe portions 5b, 5c, and 5d of the liquid-refrigerant connection pipe 5 and is fed to the relay units 4b, 4c, and 4d (see the points F in FIG. 5). The refrigerants fed to the relay units 4b, 4c, and 4d are decompressed by the relay expansion valves 71b, 71c, and 71d to low pressure. The refrigerants flow out of the relay units 4b, 4c, and 4d (see the points H in FIG. 5).

The refrigerants flowed out of the relay units 4b, 4c, and 4d are fed to the indoor units 3b, 3c, and 3d (see the points I in FIG. 5) through the second branch-pipe portions 5bb, 5cc, and 5dd (portions of the liquid-refrigerant connection pipe 5 that connect the relay units 4b, 4c, and 4d and the indoor units 3b, 3c, and 3d). The refrigerants fed to the indoor units 3b, 3c, and 3d are fed to the indoor heat exchangers 52b, 52c, and 52d through the indoor expansion valves 51b, 51c, and 51d, which are fully opened (see the points J in FIG. 5). The refrigerants fed to the indoor heat exchangers 52b, 52c, and 52d are heated and evaporated in the indoor heat exchangers 52b, 52c, and 52d, which function as evaporators for refrigerant, by exchanging heat with indoor air supplied from indoor spaces by the indoor fans 55b, 55c, and 55d (see the points K in FIG. 5). The refrigerants flow out of the indoor units 3b, 3c, and 3d. The indoor air cooled in the indoor heat exchangers 52b, 52c, and 52d is fed to the indoor spaces, thereby cooling the indoor spaces.

The refrigerants flowed out of the indoor units 3b, 3c, and 3d are fed to the relay units 4b, 4c, and 4d through the branch-pipe portions 6b, 6c, and 6d of the gas-refrigerant connection pipe 6 (see the points L in FIG. 5). The refrigerants fed to the relay units 4b, 4c, and 4d flow out of the relay units 4b, 4c, and 4d through the low-pressure relay gas valves 67b, 67c, and 67d (see the points N in FIG. 5).

The refrigerants flowed out of the relay units 4b, 4c, and 4d are joined and fed to the outdoor unit 2 (see the point P in FIG. 5) through the low-pressure-gas-refrigerant connection pipe 8 (the junction pipe portion and the branch-pipe portions 8b, 8c, and 8d). The refrigerant fed to the outdoor unit 2 is sucked into the compressor 21 through the gas-side shutoff valves 28a and 28b, the third switching mechanism 22c, and the accumulator 29 (see the point A in FIG. 5).

Also during the cooling main operation, as in cooling only operation, an operation of feeding refrigerant from the outdoor heat exchangers 23a and 23 to the indoor heat exchangers 52b, 52c, and 52d, which function as evaporators for refrigerant, through the liquid-refrigerant connection pipe 5 and the relay units 4b, 4c, and 4d is performed (see FIG. 2). Therefore, the control unit 19 performs control in the same way as in cooling only operation. To be specific, the air conditioner 1 performs two-phase transport of refrigerant, with which refrigerant in a gas-liquid two-phase state is fed from the outdoor unit 2 to the indoor units 3a and 3b through the liquid-refrigerant connection pipe 5 by using the liquid-pressure-adjusting expansion valve 26. Moreover, variation in the liquid pipe temperature Tlp in a portion of the outdoor liquid-refrigerant pipe 34 between the outdoor refrigerant cooler 45 and the liquid-pressure-adjusting expansion valve 26 is suppressed by cooling refrigerant flowing through the outdoor liquid-refrigerant pipe 34 by using the outdoor refrigerant-return pipe 41 and the outdoor refrigerant cooler 45; and increase in the discharge temperature Td of the compressor 21 is suppressed by using the liquid injection pipe 46. Thus, two-phase transport of refrigerant can be smoothly performed. Furthermore, regarding the indoor units 3b, 3c, and 3d that perform cooling operation, the refrigerant in a gas-liquid two-phase state, which has been decompressed by the liquid-pressure-adjusting expansion valve 26, is further decompressed by using the relay expansion valves 71b, 71c, and 71d, and fed to the indoor units 3b, 3c, and 3d. Therefore, also during cooling main operation, noise generated from the indoor units 3b, 3c, and 3d can be suppressed, because refrigerant in a gas-liquid two-phase state, which has been decompressed by the liquid-pressure-adjusting expansion valve 26, is decompressed by using the relay expansion valves 71b, 71c, and 71d of the relay units 4b, 4c, and 4d. Moreover, also during the cooling main operation, as in heating only operation, an operation of feeding refrigerant from the compressor 21 to the indoor heat exchanger 52a, which functions as a radiator for refrigerant, through the gas-refrigerant connection pipe 6 and the relay unit 4a is performed (see FIG. 4). Therefore, regarding the indoor unit 3a that performs heating operation and the corresponding relay unit 4a, the control unit 19 performs control in the same way as in heating only operation. To be specific, the control unit 19 controls the opening degree of the relay expansion valve 71a so that the degree of subcooling SCr of refrigerant at the liquid-side end of the indoor heat exchanger 52a becomes the target degree of subcooling SCrt.

<Heating Main Operation>

Figure 6:
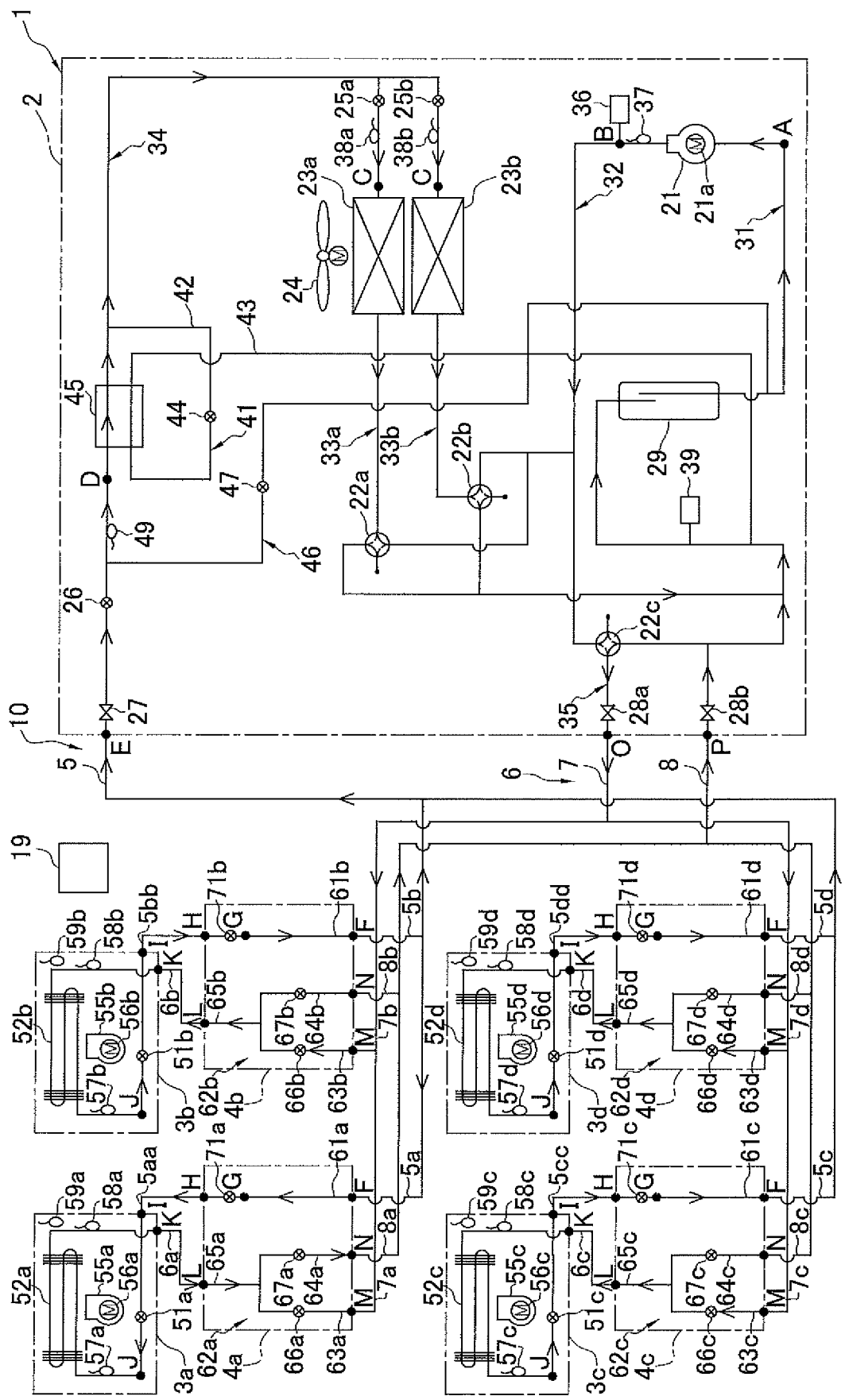
FIG. 6 illustrates flow of refrigerant during heating main operation of the air conditioner according to the embodiment of the present invention.

When performing heating main operation, for example, when the indoor units 3b, 3c, and 3d perform heating operation and the indoor unit 3a performs cooling operation (that is, the indoor heat exchangers 52b, 52c, and 52d function as radiators for refrigerant and the indoor heat exchanger 52a functions as an evaporator for refrigerant) and the outdoor heat exchangers 23a and 23b function as evaporators for refrigerant, the switching mechanisms 22a and 22b are switched to outdoor evaporator states (shown by solid lines in the switching mechanisms 22a and 22b in FIG. 6) and the compressor 21, the outdoor fan 24, and the indoor fans 55a, 55b, 55c, and 55d are driven. The third switching mechanism 22c is switched to a refrigerant outflow state (shown by broken lines in the switching mechanism 22c in FIG. 6), the high-pressure relay gas valve 66a of the relay unit 4a and the low-pressure relay gas valves 67b, 67c, and 67d of the relay units 4b, 4c, and 4d are closed, and the low-pressure relay gas valve 67a of the relay unit 4a and the high-pressure relay gas valves 66b, 66c, and 66d of the relay units 4b, 4c, and 4d are opened.

Then, high-pressure refrigerant discharged from the compressor 21 flows out of the outdoor unit 2 through the third switching mechanism 22c and the gas-side shutoff valve 28a (see the points B and O in FIG. 6).

The refrigerant flowed out of the outdoor unit 2 branches through the gas-refrigerant connection pipe 6 (the junction pipe portion and the branch-pipe portions 7b, 7c, and 7d of the high/low-pressure-gas-refrigerant connection pipe 7) and is fed to the relay units 4b, 4c, and 4d (see the points M in FIG. 6). The refrigerants fed to the relay units 4b, 4c, and 4d flow out of the relay units 4b, 4c, and 4d through the high-pressure relay gas valves 66b, 66c, and 66d (see the points L in FIG. 6).

The refrigerants flowed out of the relay units 4b, 4c, and 4d are fed to the indoor units 3b, 3c, and 3d (see the points K in FIG. 6) through the branch-pipe portions 6b, 6c, and 6d (portions of the gas-refrigerant connection pipe 6 that connect the relay units 4b, 4c, and 4d and the indoor units 3b, 3c, and 3d). The refrigerants fed to the indoor units 3b, 3c, and 3d are fed to the indoor heat exchangers 52b, 52c, and 52d. The high-pressure refrigerants fed to the indoor heat exchangers 52b, 52c, and 52d are cooled and condensed in the indoor heat exchangers 52b, 52c, and 52d, which function as radiators for refrigerant, by exchanging heat with indoor air supplied by the indoor fans 55b, 55c, and 55d (see the points J in FIG. 6). The refrigerants flow out of the indoor units 3b, 3c, and 3d through the indoor expansion valves 51b, 51c, and 51d, which are fully opened (see the points I in FIG. 6). The indoor air heated in the indoor heat exchangers 52b, 52c, and 52d is fed to the indoor spaces, thereby heating the indoor spaces.

The refrigerants flowed out of the indoor units 3b, 3c, and 3d are fed to the relay units 4b, 4c, and 4d (see the points H in FIG. 6) through the second branch-pipe portions 5bb, 5cc, and 5dd (portions of the liquid-refrigerant connection pipe 5 that connect the relay units 4b, 4c, and 4d and the indoor units 3b, 3c, and 3d). The refrigerants fed to the relay units 4b, 4c, and 4d are decompressed by the relay expansion valves 71b, 71c, and 71d (see the points G in FIG. 6). The refrigerants flow out of the relay units 4b, 4c, and 4d (see the points F in FIG. 6).

The refrigerants flowed out of the relay units 4a, 4b, 4c, and 4d are joined in the junction pipe portion through the first branch-pipe portions 5b, 5c, and 5d of the liquid-refrigerant connection pipe 5. A part of the refrigerant is branched to the first branch-pipe portion 5a and fed to the relay unit 4a (see the point F in FIG. 6), and the remaining part of the refrigerant is fed to the outdoor unit 2 through the junction pipe portion of the liquid-refrigerant connection pipe 5 (see the point E in FIG. 6).

The refrigerant fed to the relay unit 4a is decompressed by the relay expansion valve 71a to low pressure. The refrigerant flows out of the relay unit 4a (see the point H in FIG. 6).

The refrigerant flowed out of the relay unit 4a is fed to the indoor unit 3a (see the point I in FIG. 6) through the second branch-pipe portion 5aa (a portion of the liquid-refrigerant connection pipe 5 that connects the relay unit 4a and the indoor unit 3a). The refrigerant fed to the indoor unit 3a is fed to the indoor heat exchanger 52a through the indoor expansion valve 51a, which is fully opened (see the point J in FIG. 6). The refrigerant fed to the indoor heat exchanger 52a is heated and evaporated in the indoor heat exchanger 52a, which functions as an evaporator for refrigerant, by exchanging heat with indoor air supplied from an indoor space by the indoor fan 55a (see the point K in FIG. 6). The refrigerant flows out of the indoor unit 3a. The indoor air cooled in the indoor heat exchanger 52a is fed to the indoor space, thereby cooling the indoor space.

The refrigerant flowed out of the indoor unit 3a is fed to the relay unit 4a through the branch-pipe portion 6a of the gas-refrigerant connection pipe 6 (see the point L in FIG. 6). The refrigerant fed to the relay unit 4a flows out of the relay unit 4a through the low-pressure relay gas valve 67a (see the point N in FIG. 6).

The refrigerant flowed out of the relay unit 4a is fed to the outdoor unit 2 (see the point P in FIG. 6) through the low-pressure-gas-refrigerant connection pipe 8 (the junction pipe portion and the branch-pipe portion 8a).

The refrigerant fed to the outdoor unit 2 through the junction pipe portion of the liquid-refrigerant connection pipe 5 is fed to the outdoor expansion valves 25a and 25b through the liquid-side shutoff valve 27, the liquid-pressure-adjusting expansion valve 26, and the outdoor refrigerant cooler 45 (see the point D in FIG. 6). The refrigerants fed to the outdoor expansion valves 25a and 25b are decompressed by the outdoor expansion valves 25a and 25b to low pressure, and then fed to the outdoor heat exchangers 23a and 23b (see the points C in FIG. 6). The refrigerants fed to the outdoor heat exchangers 23a and 23b are heated and evaporated by exchanging heat with outdoor air supplied by the outdoor fan 24 (see the point A in FIG. 6). The refrigerants are joined, through the switching mechanisms 22a and 22b and the accumulator 29, with the refrigerant fed to the outdoor unit 2 through the low-pressure-gas-refrigerant connection pipe 8, and sucked into the compressor 21.

Also during the heating main operation, as in heating only operation, an operation of feeding refrigerant from the compressor 21 to the indoor heat exchangers 52b, 52c, and 52d, which function as radiators for refrigerant, through the gas-refrigerant connection pipe 6 and the relay units 4b, 4c, and 4d is performed (see FIG. 4). Therefore, the control unit 19 performs control in the same way as in heating only operation. To be specific, the control unit 19 performs control to control the opening degrees of the relay expansion valves 71b, 71c, and 71d and to fix the liquid-pressure-adjusting expansion valve 26 in a fully open state so that the degree of subcooling SCr of refrigerant at the liquid-side end of each of the indoor heat exchangers 52b, 52c, and 52d becomes the target degree of subcooling SCrt, and to cause the opening degree of the outdoor refrigerant-return expansion valve 44 and the liquid injection expansion valve 47 to be in fully closed states so as not to feed refrigerant to the outdoor refrigerant-return pipe 41 and the liquid injection pipe 46.

(3) First Modification

In the air conditioner 1 according to the embodiment (see FIGS. 1 to 6), the relay expansion valves 71a, 71b, 71c, and 71d decompress refrigerants in a gas-liquid two-phase state that have been decompressed by the liquid-pressure-adjusting expansion valve 26. Therefore, although the indoor units 3a, 3b, 3c, and 3d do not generate noise, the relay units 4a, 4b, 4c, and 4d generate noise. If the relay units 4a, 4b, 4c, and 4d are disposed near the indoor units 3a, 3b, 3c, and 3d, the noise may be transmitted to the indoor units 3a, 3b, 3c, and 3d.

Figure 7:
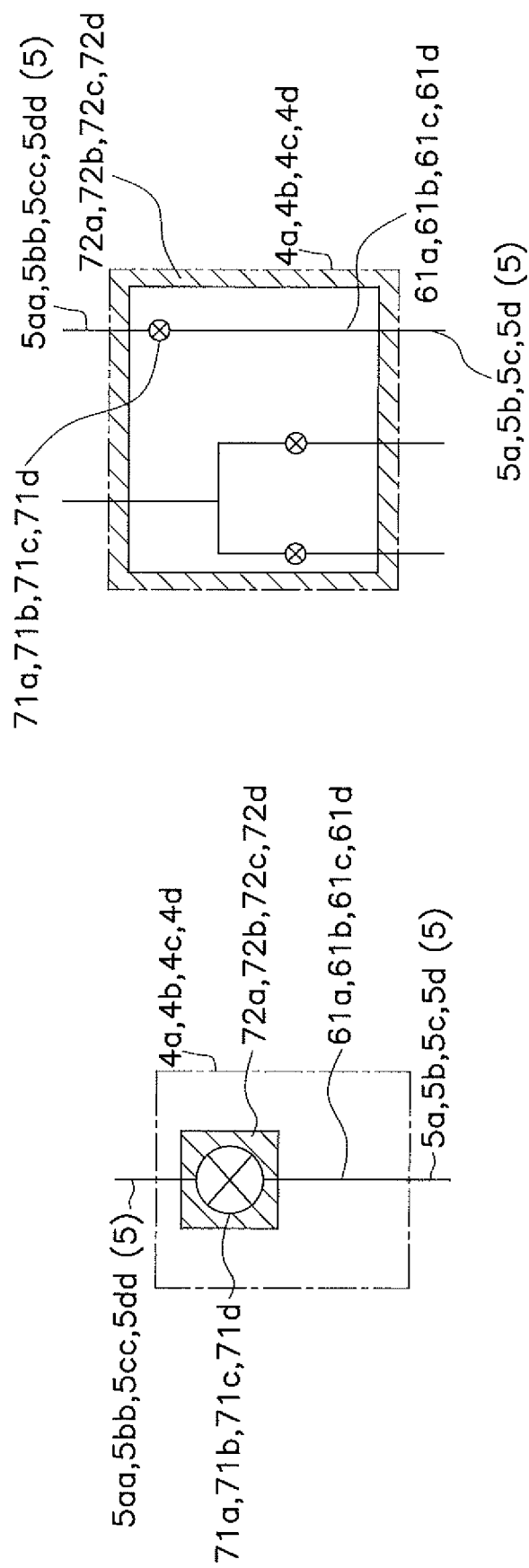
FIG. 7 illustrates a relay unit of an air conditioner according to a first modification of the present invention.

In the present modification, as illustrated in FIG. 7, the relay units 4a, 4b, 4c, and 4d or the relay expansion valves 71a, 71b, 71c, and 71d include silencers 72a, 72b, 72c, and 72d.

Thus, generation of noise from the relay units 4a, 4b, 4c, and 4d can be suppressed, and the relay units 4a, 4b, 4c, and 4d can be disposed near the indoor units 3a, 3b, 3c, and 3d.

(4) Second Modification

In the air conditioner 1 according to the embodiment (see FIGS. 1 to 6), the relay expansion valves 71a, 71b, 71c, and 71*d* decompress refrigerants in a gas-liquid two-phase state that have been decompressed by the liquid-pressure-adjusting expansion valve 26. Therefore, although the indoor units 3*a*, 3*b*, 3*c*, and 3*d* do not generate noise, the relay units 4*a*, 4*b*, 4*c*, and 4*d* generate noise. If the relay units 4*a*, 4*b*, 4*c*, and 4*d* are disposed near the indoor units 3*a*, 3*b*, 3*c*, and 3*d*, the noise may be transmitted to the indoor units 3*a*, 3*b*, 3*c*, and 3*d*.

Figure 8:
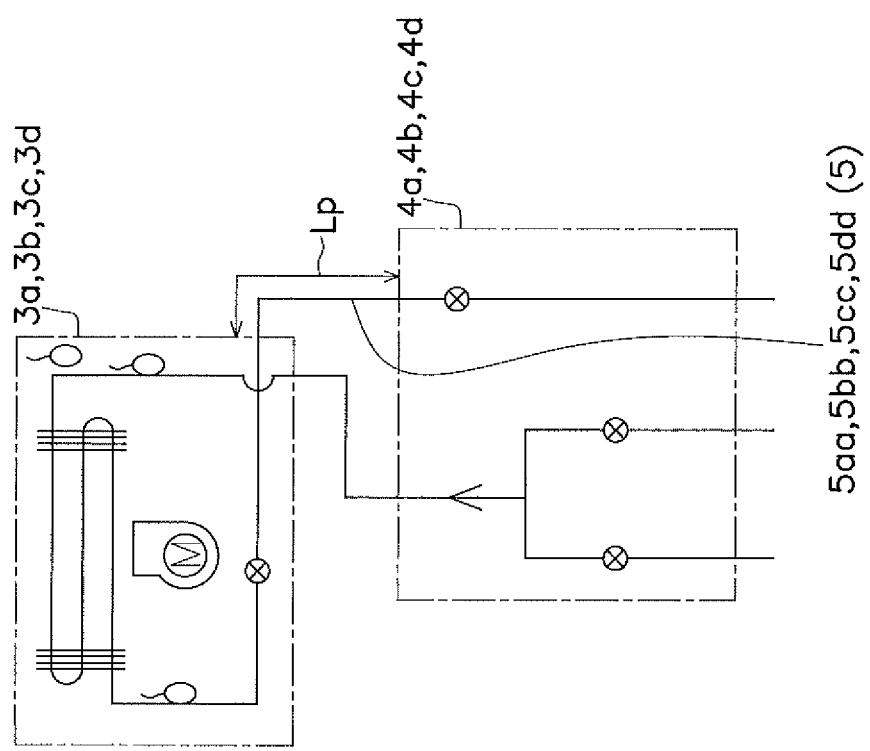
FIG. 8 illustrates the positional relationship between an indoor unit and a relay unit of an air conditioner according to a second modification of the present invention.

In the present modification, as illustrated in FIG. 8, each of the relay units 4*a*, 4*b*, 4*c*, and 4*d* is disposed at a position that is separated by 5 m or more, or, preferably, 10 m or more from a connection portion of a corresponding one of the indoor units 3*a*, 3*b*, 3*c*, and 3*d* to which the liquid-refrigerant connection pipe 5 is connected, as measured along the length Lp of the liquid-refrigerant connection pipe 5 (each of the second branch-pipe portions 5*aa*, 5*bb*, 5*cc*, and 5*dd*). To be specific, the length Lp of each of portions (the second branch-pipe portions 5*aa*, 5*bb*, 5*cc*, and 5*dd*) of the liquid-refrigerant connection pipe 5 that connect the relay units 4*a*, 4*b*, 4*c*, and 4*d* and the indoor units 3*a* and 3*b*, 3*b*, 3*c* is 5 m or more, or preferably, 10 m or more.

Thus, transmission of noise from the relay units 4*a*, 4*b*, 4*c*, and 4*d* to the indoor units 3*a*, 3*b*, 3*c*, and 3*d* can be suppressed. Although not illustrated in the figures, by additionally using the structure according to the first modification, in which the silencers are disposed in the relay units 4*a*, 4*b*, 4*c*, and 4*d* or the relay expansion valves 71*a*, 71*b*, 71*c*, and 71*d*, the length Lp of each of portions (the second branch-pipe portions 5*aa*, 5*bb*, 5*cc*, and 5*dd*) of the liquid-refrigerant connection pipe 5 that connect the relay units 4*a*, 4*b*, 4*c*, and 4*d* and the indoor units 3*a* and 3*b*, 3*b*, 3*c* may be reduced.

(5) Third Modification

In the air conditioner 1 that includes the indoor units 3*a*, 3*b*, 3*c*, and 3*d* having the indoor expansion valves 51*a*, 51*b*, 51*c*, and 51*d*, if the relay units 4*a*, 4*b*, 4*c*, and 4*d* include the relay expansion valves 71*a*, 71*b*, 71*c*, and 71*d* (see FIGS. 1 to 6), as in the embodiment and the first and second modifications, not only during cooling only operation and cooling main operation but also during heating only operation and heating main operation, the indoor expansion valves 51*a*, 51*b*, 51*c*, and 51*d* may be fully opened and the opening degrees of the relay expansion valves 71*a*, 71*b*, 71*c*, and 71*d* may be controlled. When stopping the compressor 21, the relay expansion valves 71*a*, 71*b*, 71*c*, and 71*d* may be closed while keeping the indoor expansion valves 51*a*, 51*b*, 51*c*, and 51*d* fully open, from a state in which the opening degrees of the relay expansion valves 71*a*, 71*b*, 71*c*, and 71*d* are controlled.

However, also during heating only operation and heating main operation, if the indoor expansion valves 51*a*, 51*b*, 51*c*, and 51*d* are fully opened and the opening degrees of the relay expansion valves 71*a*, 71*b*, 71*c*, and 71*d* are controlled, the amount of refrigerant that accumulates in portions (the second branch-pipe portions 5*aa*, 5*bb*, 5*cc*, and 5*dd*) of the liquid-refrigerant connection pipe 5 between the indoor units 3*a*, 3*b*, 3*c*, and 3*d* and the relay units 4*a*, 4*b*, 4*c*, and 4*d* increases. That is, during heating only operation and heating main operation, because refrigerant releases heat and condenses in the indoor heat exchangers 52*a*, 52*b*, 52*c*, and 52*d*, the second branch-pipe portions 5*aa*, 5*bb*, 5*cc*, and 5*dd* are filled with refrigerant in a liquid state (see the points H and I in FIG. 4). Also when stopping the compressor 21, if the relay expansion valves 71*a*, 71*b*, 71*c*, and 71*d* are closed while keeping the indoor expansion valves 51*a*, 51*b*, 51*c*, and 51*d* fully open from a state in which the opening degrees of the relay expansion valves 71*a*, 71*b*, 71*c*, and 71*d* are controlled, as in heating only operation and in heating main operation, the amount of refrigerant that accumulates in the second branch-pipe portions 5*aa*, 5*bb*, 5*cc*, and 5*dd* increases. In particular, the amount of accumulated refrigerant considerably increases, if the relay units 4*a*, 4*b*, 4*c*, and 4*d* are disposed at positions that are separated from the indoor units 3*a*, 3*b*, 3*c*, and 3*d* (such as positions separated by 10 m or more from connection portions of the indoor units 3*a*, 3*b*, 3*c*, and 3*d* to which the liquid-refrigerant connection pipe 5 is connected, as measured along the length Lp of the liquid-refrigerant connection pipe 5).

In the present modification, as in heating only operation and heating main operation, when feeding refrigerant from the compressor 21 to the indoor heat exchangers 52*a*, 52*b*, 52*c*, and 52*d*, which function as radiators for refrigerant, through the gas-refrigerant connection pipe 6 and the relay units 4*a*, 4*b*, 4*c*, and 4*d*, the control unit 19 fully opens the relay expansion valves 71*a*, 71*b*, 71*c*, and 71*d* and controls the opening degrees of the indoor expansion valves 51*a*, 51*b*, 51*c*, and 51*d*. Also when stopping the compressor 21 from this state, the control unit 19 closes the indoor expansion valves 51*a*, 51*b*, 51*c*, and 51*d* while keeping the relay expansion valves 71*a*, 71*b*, 71*c*, and 71*d* fully open from the state in which the control unit 19 controls the opening degrees of the indoor expansion valves 51*a*, 51*b*, 51*c*, and 51*d*.

To be specific, during cooling only operation and cooling main operation, as in the embodiment and the first and second modifications, the control unit 19 fully opens the indoor expansion valves 51*a*, 51*b*, 51*c*, and 51*d* and controls the opening degrees of the relay expansion valves 71*a*, 71*b*, 71*c*, and 71*d*; and, also when stopping the compressor 21 from this state, the control unit 19 closes the relay expansion valves 71*a*, 71*b*, 71*c*, and 71*d* while keeping the indoor expansion valves 51*a*, 51*b*, 51*c*, and 51*d* fully open. Therefore, refrigerants flowing through the junction pipe portion of the liquid-refrigerant connection pipe 5 is decompressed by the relay expansion valves 71*a*, 71*b*, 71*c*, and 71*d* to enter a low-pressure gas-liquid two-phase state (see the points G and H in FIGS. 1, 2, and 5); the refrigerants are fed to the indoor units 3*a*, 3*b*, 3*c*, and 3*d* (see the points I in FIGS. 1, 2, and 5) through the second branch-pipe portions 5*aa*, 5*bb*, 5*cc*, and 5*dd* of the liquid-refrigerant connection pipe 5; and the refrigerants are fed to the indoor heat exchangers 52*a*, 52*b*, 52*c*, and 52*d* without being decompressed by the indoor expansion valves 51*a*, 51*b*, 51*c*, and 51*d* (see the points J in FIGS. 1, 2, and 5). On the other hand, during heating only operation and heating main operation, in contrast to the embodiment and the first and second modifications, the control unit 19 fully opens the relay expansion valves 71*a*, 71*b*, 71*c*, and 71*d* and controls the opening degrees of the indoor expansion valves 51*a*, 51*b*, 51*c*, and 51*d*; and, also when stopping the compressor 21 from this state, the control unit 19 closes the indoor expansion valves 51*a*, 51*b*, 51*c*, and 51*d* while keeping the relay expansion valves 71*a*, 71*b*, 71*c*, and 71*d* fully open. When controlling the opening degrees of the indoor expansion valves 51*a*, 51*b*, 51*c*, and 51*d*, the control unit 19 controls the opening degrees of the indoor expansion valves 51*a*, 51*b*, 51*c*, and 51*d* so that the degree of subcooling SCr of refrigerant at the liquid-side end of each of the indoor heat exchangers 52*a*, 52*b*, 52*c*, and 52*d* becomes the target degree of subcooling SCrt. This opening degree control is the same as that of the embodiment and the first and second modifications, except that the components to be operated are not the relay expansion valves 71*a*, 71*b*, 71*c*, and 71*d* but the indoor expansion valves 51*a*, 51*b*, 51*c*, and 51*d*. Therefore, refrigerants that have released heat in the indoor heat exchangers 52a, 52b, 52c, and 52d are decompressed by the indoor expansion valves 51a, 51b, 51c, and 51d to enter a gas-liquid two-phase state (see the points I and J in FIGS. 3, 6, and 9). The refrigerants are fed to the relay units 4a, 4b, 4c, and 4d (see the points H and I in FIGS. 3, 6, and 9) through the second branch-pipe portions 5aa, 5bb, 5cc, and 5dd of the liquid-refrigerant connection pipe 5; and the refrigerants are fed to the junction pipe portion of the liquid-refrigerant connection pipe 5 without being decompressed by the relay expansion valves 71a, 71b, 71c, and 71d (see the points H, G, and F in FIGS. 3, 6, and 9).

Figure 9:
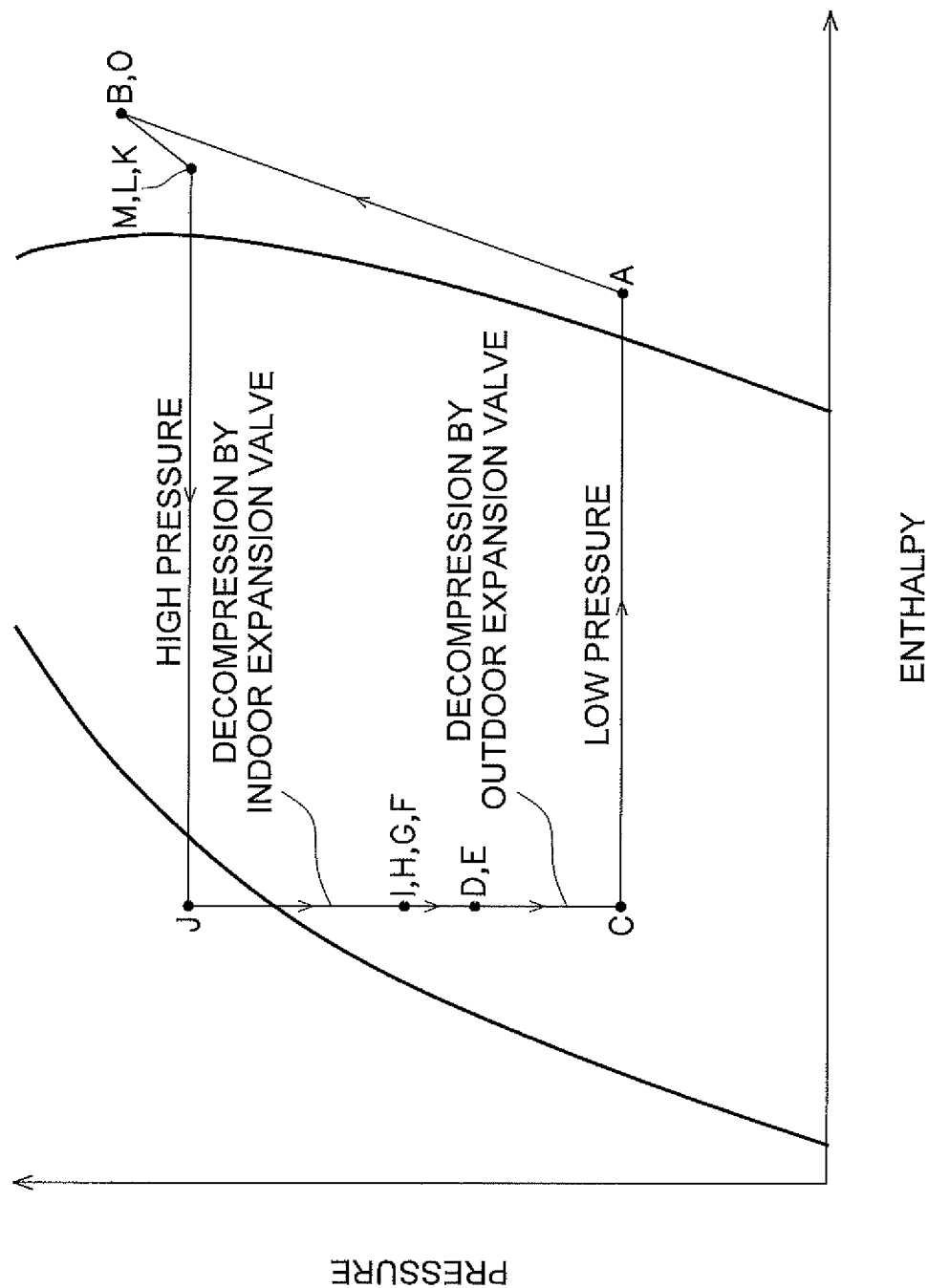
FIG. 9 is a pressure-enthalpy diagram illustrating a refrigeration cycle during heating only operation of an air conditioner according to a third modification of the present invention.

Thus, when feeding refrigerant from the compressor 21 to the indoor heat exchangers 52a, 52b, 52c, and 52d, which function as radiators for refrigerant, through the gas-refrigerant connection pipe 6 and the relay units 4a, 4b, 4c, and 4d, refrigerants that have been decompressed by the indoor expansion valves 51a, 51b, 51c, and 51d flow into portions of the liquid-refrigerant connection pipe 5 between the indoor units 3a, 3b, 3c, and 3d and the relay units 4a, 4b, 4c, and 4d (see the points H and I in FIG. 9). Therefore, the amount of accumulated refrigerant can be reduced. Also when stopping the compressor 21, because the indoor expansion valves 51a, 51b, 51c, and 51d are closed, the amount of refrigerant that accumulates in portions of the liquid-refrigerant connection pipe 5 between the indoor units 3a, 3b, 3c, and 3d and the relay units 4a, 4b, 4c, and 4d can be reduced.

(6) Fourth Modification

Figure 10:
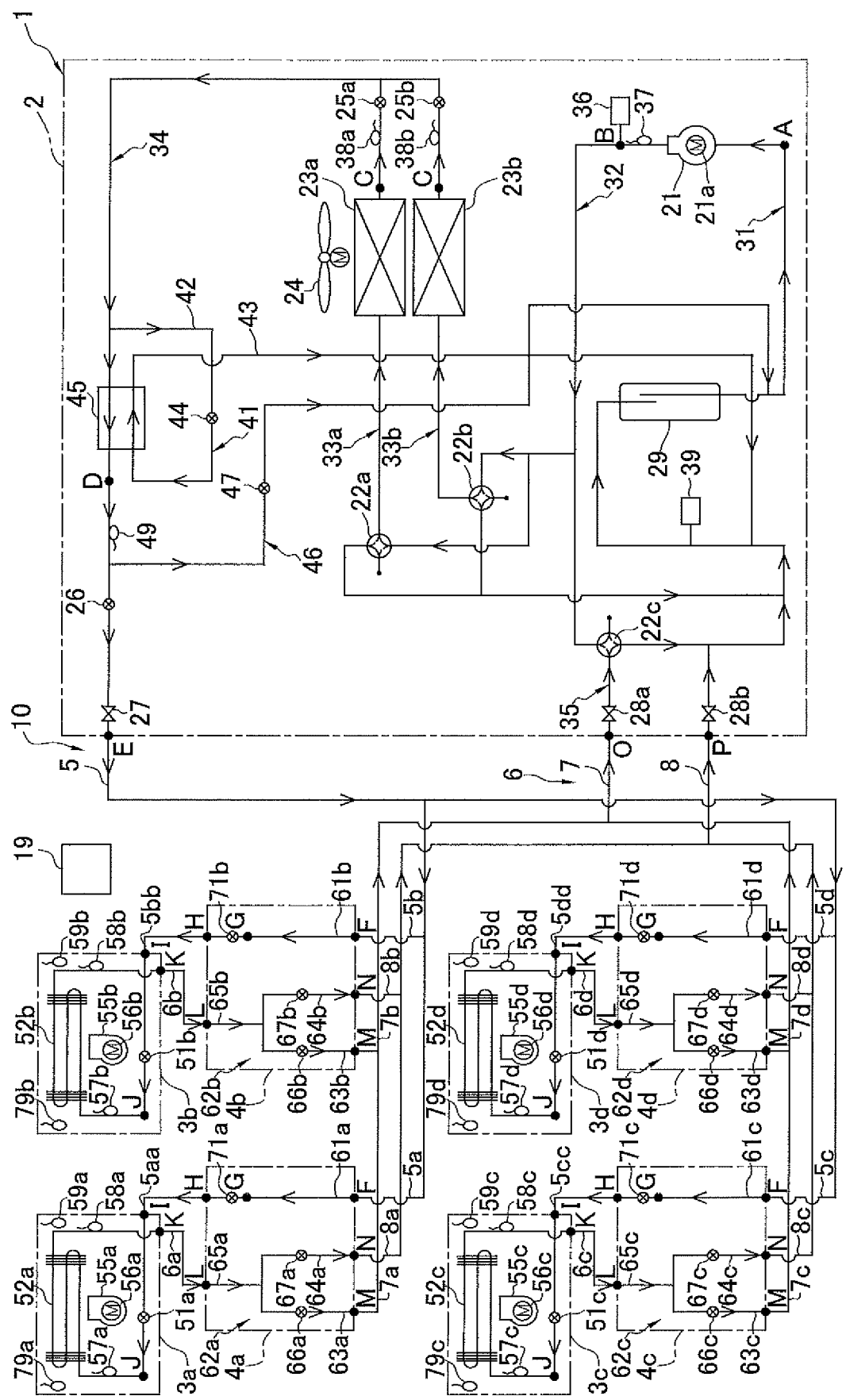
FIG. 10 is a schematic view of an air conditioner according to a fourth modification of the present invention (illustrating flow of refrigerant during cooling only operation).
Figure 11:
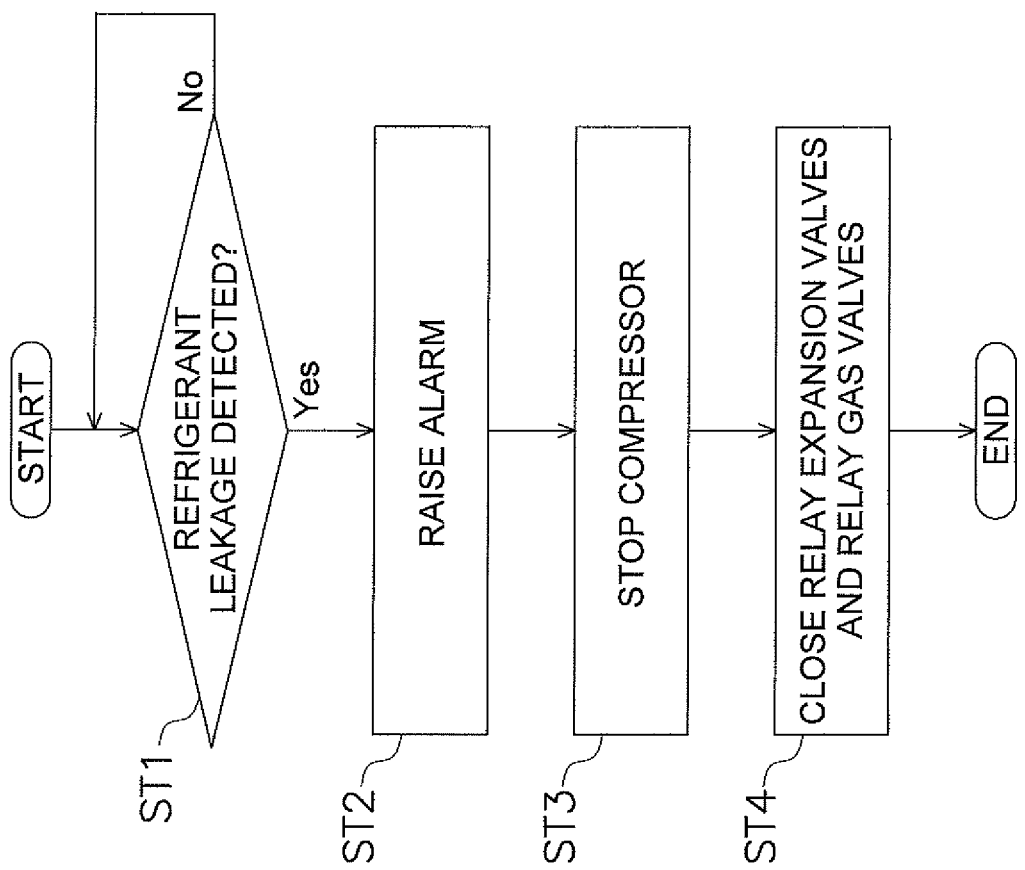
FIG. 11 is a flowchart illustrating a process that is performed if refrigerant leakage occurs in the air conditioner according to the fourth modification of the present invention.

In the air conditioner 1 according to the embodiment and the modifications (see FIGS. 1 to 9), as illustrated in FIG. 10, the indoor units 3a, 3b, 3c, and 3d may further include refrigerant sensors 79a, 79b, 79c, and 79d, which are refrigerant-leakage detection means. As illustrated in FIG. 11, if the refrigerant leakage sensors 79a, 79b, 79c, and 79d detect leakage of refrigerant (step ST1), the control unit 19 closes the relay expansion valves 71a, 71b, 71c, and 71d and the relay gas valves 66a, 66b, 66c, 66d, 67a, 67b, 67c, and 67d (step ST4). The refrigerant-leakage detection means may be the refrigerant sensors 79a, 79b, 79c, and 79d, which directly detect leaked refrigerant, as described above. Alternatively, the refrigerant-leakage detection means may detect occurrence of leakage of refrigerant or the amount of leaked refrigerant from the relationship between the temperature of refrigerant in the indoor heat exchangers 52a, 52b, 52c, and 52d (the indoor heat-exchange temperatures Trl, Trg, and the like) and the ambient temperature in the indoor heat exchangers 52a, 52b, 52c, and 52d (the indoor temperature Tra and the like) or the like. The setting positions of the refrigerant sensors 79a, 79b, 79c, and 79d need not be in the indoor units 3a, 3b, 3c, and 3d. The setting positions may be in a remote control for controlling the indoor units 3a, 3b, 3c, and 3d, or may be in indoor spaces to be air-conditioned. If leakage of refrigerant is detected in step ST1, alarm may be raised (step ST2). Excessive increase in the pressure of refrigerant may be suppressed by stopping the compressor 21 before closing the relay expansion valves 71a, 71b, 71c, 71d and the relay gas valves 66a, 66b, 66c, 66d, 67a, 67b, 67c, and 67d (step ST3).

With the present modification, if the refrigerant-leakage detection means (here, the refrigerant leakage sensors 79a, 79b, 79c, and 79d) detect leakage of refrigerant, the relay expansion valves 71a, 71b, 71c, 71d and relay gas valves 66a, 66b, 66c, 66d, 67a, 67b, 67c, and 67d are closed. Therefore, flow of refrigerant into the indoor units 3a, 3b, 3c, and 3d from the connection pipes 5 and 6 is prevented, and increase in the concentration of refrigerant in an indoor space can be suppressed.

(7) Fifth Modification

Figure 12:
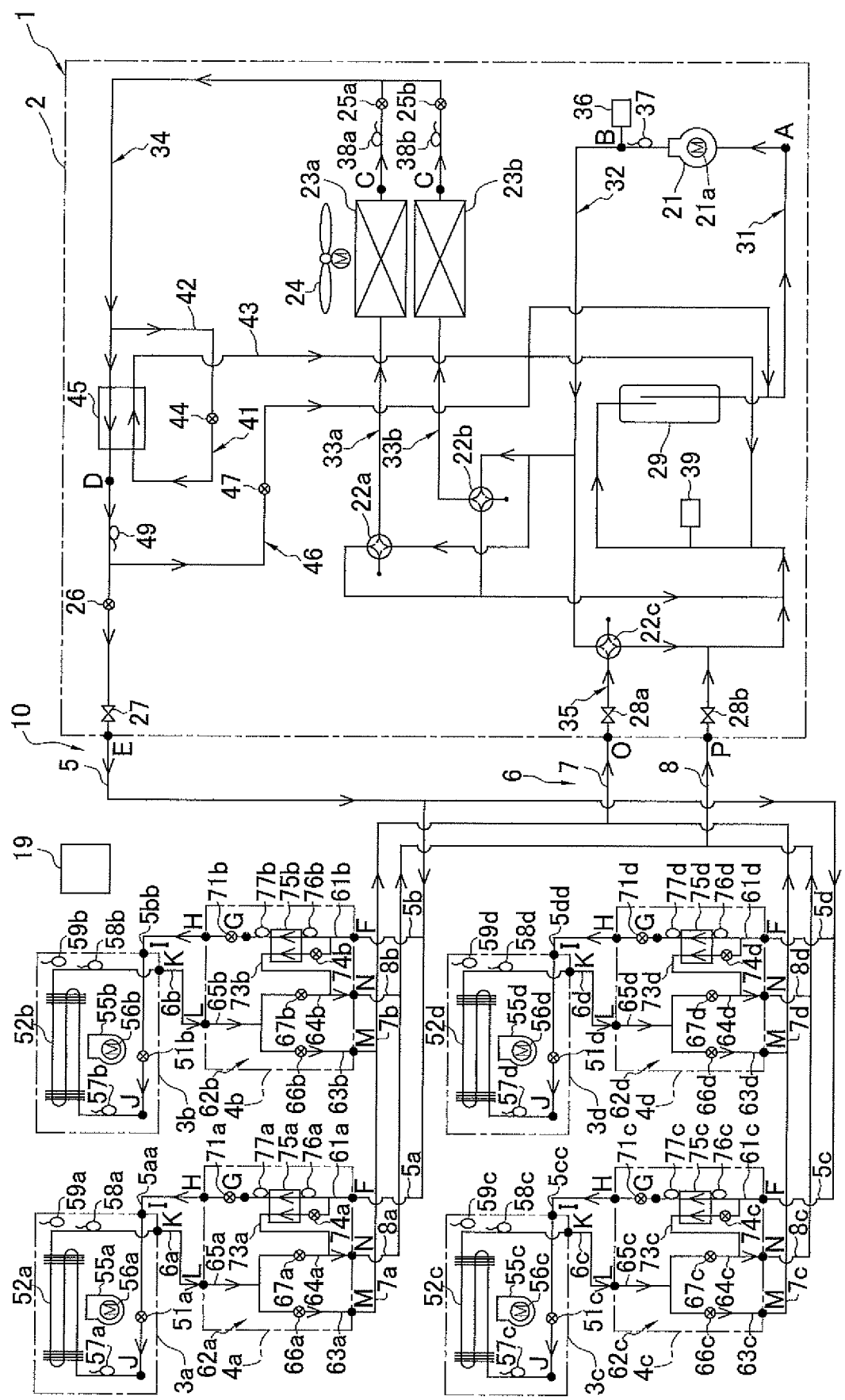
FIG. 12 is a schematic view of an air conditioner according to a fifth modification of the present invention (illustrating flow of refrigerant during cooling only operation).

In the air conditioner 1 according to the embodiment and the first to fourth modifications, as illustrated in FIG. 12, relay refrigerant return pipes 73a, 73b, 73c, and 73d are connected to and relay refrigerant coolers 75a, 75b, 75c, and 75d is provided in the liquid connection pipes 61a, 61b, 61c, and 61d of the relay units 4a, 4b, 4c, and 4d.

The relay refrigerant return pipes 73a, 73b, 73c, and 73d are refrigerant pipes that branch parts of refrigerant flowing through the liquid connection pipe 61a, 61b, 61c, and 61d and feed the parts of refrigerant to the gas connection pipes 62a, 62b, 62c, and 62d (the low-pressure gas connection pipes 64a, 64b, 64c, and 64d) that are connected to the gas-refrigerant connection pipe 6 (the low-pressure-gas-refrigerant connection pipe 8). The relay refrigerant coolers 75a, 75b, 75c, and 75d are heat exchangers that cool refrigerants flowing through portions of the liquid connection pipes 61a, 61b, 61c, and 61d that are closer than the relay expansion valves 71a, 71b, 71c, and 71d to the first branch-pipe portions 5a, 5b, 5c, and 5d of the liquid-refrigerant connection pipe 5 by using refrigerants flowing through the relay refrigerant return pipes 73a, 73b, 73c, and 73d. That is, the relay expansion valves 71a, 71b, 71c, and 71d are disposed in portions of the liquid connection pipes 61a, 61b, 61c, and 61d that are closer than portions that are connected with the relay refrigerant coolers 75a, 75b, 75c, and 75d to the second branch-pipe portions 5aa, 5bb, 5cc, and 5dd of the liquid-refrigerant connection pipe 5. In the relay refrigerant return pipes 73a, 73b, 73c, and 73d, relay refrigerant-return expansion valves 74a, 74b, 74c, and 74d, which adjust the flow rates of refrigerants that flow through the relay refrigerant coolers 75a, 75b, 75c, and 75d while decompressing refrigerants flowing through the relay refrigerant return pipes 73a, 73b, 73c, and 73d, are disposed. The relay refrigerant-return expansion valves 74a, 74b, 74c, and 74d are electric expansion valves. The relay refrigerant coolers 75a, 75b, 75c, and 75d cool refrigerants flowing through the liquid connection pipes 61a, 61b, 61c, and 61d by using refrigerants flowing through the relay refrigerant return pipes 73a, 73b, 73c, and 73d (to be specific, refrigerants that have been decompressed by the relay refrigerant-return expansion valves 74a, 74b, 74c, and 74d).

Figure 13:
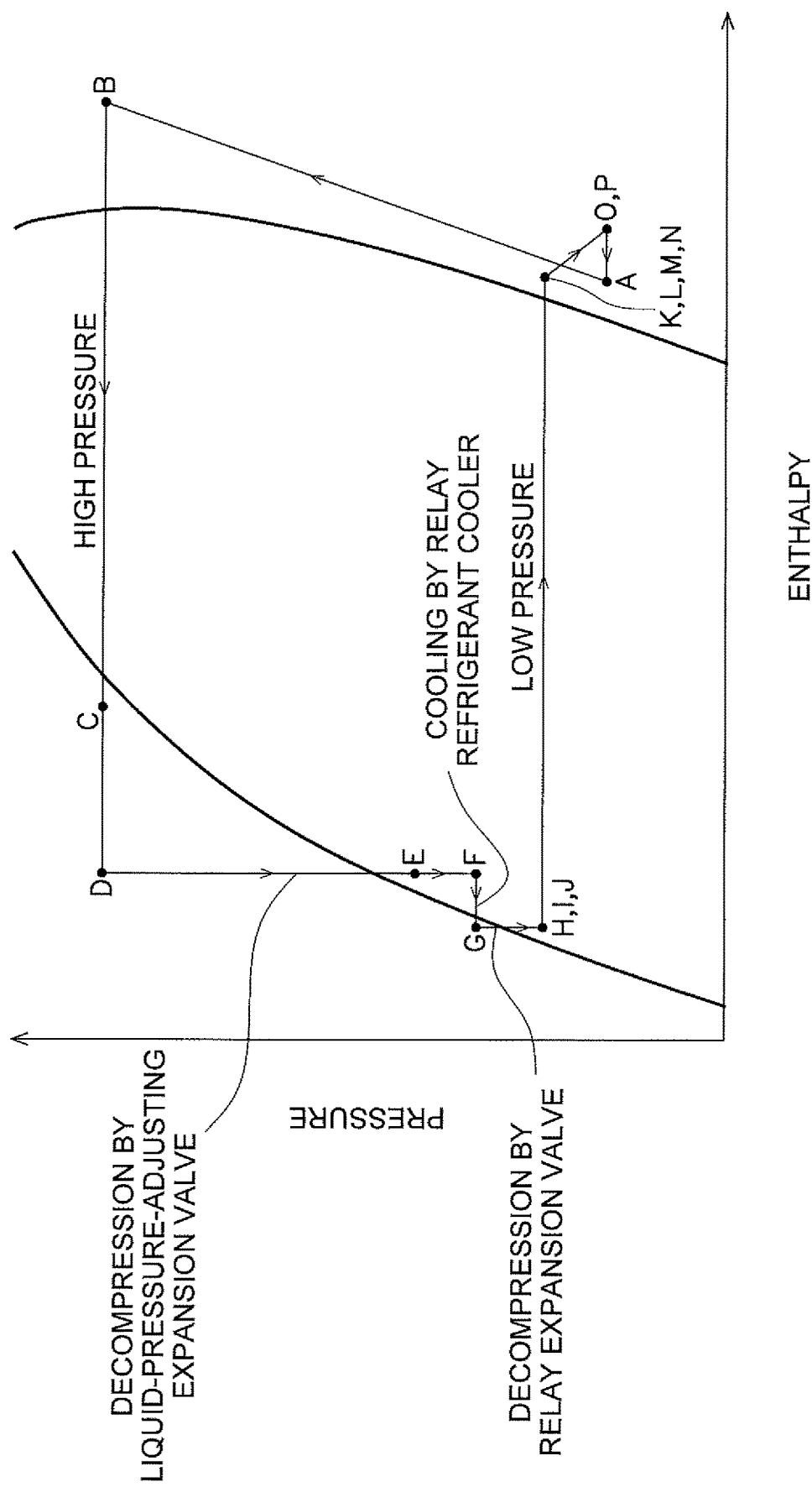
FIG. 13 is a pressure-enthalpy diagram of a refrigeration cycle during cooling only operation of the air conditioner according to the fifth modification of the present invention.

When performing cooling only operation and cooling main operation (when feeding refrigerants from the outdoor heat exchangers 23a and 23b to the indoor heat exchangers 52a, 52b, 52c, and 52d, which function as evaporators for refrigerant, through the liquid-refrigerant connection pipe 5 and the relay units 4a, 4b, 4c, and 4d), the relay refrigerant coolers 75a, 75b, 75c, and 75d of the relay units 4a, 4b, 4c, and 4d cool refrigerant in a gas-liquid two-phase state that has been decompressed by the liquid-pressure-adjusting expansion valve 26 (see the points F and G in FIG. 13). Therefore, in contrast to the embodiment and the modifications (see the point G in FIG. 2), refrigerants that flow into the relay expansion valves 71a, 71b, 71c, and 71d can be made to be not in a gas-liquid two-phase state but in a liquid single-phase state (see the point G in FIG. 13). The relay expansion valves 71a, 71b, 71c, and 71d further decompress refrigerants that have been decompressed by the relay refrigerant coolers 75a, 75b, 75c, and 75d and can feed the refrigerants to the indoor units 3a, 3b, 3c, and 3d (see the point H in FIG. 13). Thus, refrigerant passing noise that is generated when the refrigerants in a gas-liquid two-phase state pass through the relay expansion valves 71a, 71b, 71c, and 71d can be prevented from being generated in the relay units 4a, 4b, 4c, and 4d.

Thus, not only noise generated from the indoor units 3a, 3b, 3c, and 3d but also noise generated from the relay units 4a, 4b, 4c, and 4d can be suppressed by providing the relay refrigerant coolers 75a, 75b, 75c, and 75d in the relay units 4a, 4b, 4c, and 4d in a structure including the liquid-pressure-adjusting expansion valve 26 and by cooling refrigerant in a gas-liquid two-phase state that has been decompressed by the liquid-pressure-adjusting expansion valve 26.

In the present modification, the control unit 19 adjusts the flow rates of refrigerants that flows through the relay refrigerant return pipes 73a, 73b, 73c, and 73d by controlling the opening degrees of the relay refrigerant-return expansion valves 74a, 74b, 74c, and 74d. To be specific, relay inlet temperature sensors 76a, 76b, 76c, and 76d are disposed on the inlet side of the relay refrigerant coolers 75a, 75b, 75c, and 75d; and relay outlet temperature sensors 77a, 77b, 77c, and 77d are disposed on the outlet side of the relay refrigerant coolers 75a, 75b, 75c, and 75d. The control unit 19 controls the opening degrees of the relay refrigerant-return expansion valves 74a, 74b, 74c, and 74d so that the relay outlet temperature Tmo detected by the relay outlet temperature sensors 77a, 77b, 77c, and 77d becomes a predetermined value ΔT lower than the relay inlet temperature Tmi detected by relay inlet temperature sensors 76a, 76b, 76c, and 76d. Thus, refrigerants on the outlet side of the relay refrigerant coolers 75a, 75b, 75c, and 75d can be made to be in a liquid single-phase state, and the effect of suppressing noise generated from the indoor units 3a, 3b, 3c, and 3d and the relay units 4a, 4b, 4c, and 4d can be reliably obtained.

(8) Other Modifications

<A>

In the air conditioner 1 according to the embodiment and the first to fifth modifications, during cooling only operation and cooling main operation, when performing two-phase transport of refrigerant, with which the refrigerant in a gas-liquid two-phase state is fed from the outdoor unit 2 to the indoor units 3a and 3b through the liquid-refrigerant connection pipe 5 by using the liquid-pressure-adjusting expansion valve 26, an operation of suppressing variation in the liquid pipe temperature Tlp is performed by using the outdoor refrigerant-return pipe 41 and the outdoor refrigerant cooler 45 and an operation of suppressing increase in the discharge temperature Td is performed by using the liquid injection pipe 46.

However, it is not necessary to perform the operation of suppressing variation in the liquid pipe temperature Tlp by using the outdoor refrigerant-return pipe 41 and the outdoor refrigerant cooler 45 and/or to perform the operation of suppressing the discharge temperature Td by using the liquid injection pipe 46.

<B>

In the air conditioner 1 according to the embodiment and the first to fifth modifications, the relay units 4a, 4b, 4c, and 4d correspond one-to-one to the indoor units 3a, 3b, 3c, and 3d. However, this is not a limitation, and, for example, all the relay units 4a, 4b, 4c, and 4d or some the relay units 4a, 4b, 4c, and 4d may be integrated with each other.

INDUSTRIAL APPLICABILITY

The present invention can be widely used for an air conditioner including an outdoor unit including an outdoor heat exchanger, a plurality of indoor units each including an indoor heat exchanger, a relay unit that switches the plurality of indoor heat exchangers so that the indoor heat exchangers individually function as an evaporator or radiator for refrigerant, and a liquid-refrigerant connection pipe and a gas-refrigerant connection pipe that connect the outdoor unit and the indoor unit to each other via the relay unit.

REFERENCE SIGNS LIST 1 air conditioner
2 outdoor unit
3a, 3b, 3c, 3d indoor unit
4a, 4b, 4c, 4d relay unit
5 liquid-refrigerant connection pipe
6 gas-refrigerant connection pipe
19 control unit
21 compressor
23a, 23b outdoor heat exchanger
26 liquid-pressure-adjusting expansion valve
34 outdoor liquid-refrigerant pipe
51a, 51b, 51c, 51d indoor expansion valve
52a, 52b, 52c, 52d indoor heat exchanger
66a, 66b, 66c, 66d high-pressure relay gas valve
67a, 67b, 67c, 67d low-pressure relay gas valve
71a, 71b, 71c, 71d relay expansion valve
72a, 72b, 72c, 72d silencer
75a, 75b, 75c, 75d relay refrigerant cooler
79a, 79b, 79c, 79d refrigerant-leakage detection means

CITATION LIST

Patent Literature

[PTL 1] International Publication No. 2015/029160

The invention claimed is:

1. An air conditioner comprising:
an outdoor unit including a compressor and an outdoor heat exchanger;
a plurality of indoor units each including an indoor heat exchanger;
at least one relay unit, including at least one relay gas valve, that switches the plurality of indoor heat exchangers so that the indoor heat exchangers individually function as an evaporator for refrigerant or a radiator for the refrigerant; and
a liquid-refrigerant connection pipe and a gas-refrigerant connection pipe that connect the outdoor unit and the indoor units to each other via the relay unit, wherein
the outdoor unit further includes a liquid-pressure-adjusting expansion valve in an outdoor liquid-refrigerant pipe that connects a liquid-side end of the outdoor heat exchanger and the liquid-refrigerant connection pipe, the liquid-pressure-adjusting expansion valve decompressing the refrigerant flowing through the liquid-refrigerant connection pipe so that the refrigerant enters a gas-liquid two-phase state when feeding the refrigerant from the outdoor heat exchanger to at least one of the indoor heat exchangers that functions as an evaporator for the refrigerant through the liquid-refrigerant connection pipe and the relay unit, and
the relay unit includes a relay expansion valve that further decompresses the refrigerant that has been decompressed by the liquid-pressure-adjusting expansion valve, wherein
each of the indoor units further includes an indoor expansion valve that is connected to a liquid-side end of the indoor heat exchanger, and
a controller that controls components of the outdoor unit, the indoor units, and the relay unit fully opens the indoor expansion valve and controls an opening degree of the relay expansion valve when feeding the refrigerant from the outdoor heat exchanger to at least one of the indoor heat exchangers that functions as an evaporator for the refrigerant through the liquid-refrigerant connection pipe and the relay unit; and the controller fully opens the relay expansion valve and controls the opening degree of the indoor expansion valve when feeding the refrigerant to at least one of the indoor heat exchangers that functions as a radiator for the refrigerant through the gas-refrigerant connection pipe and the relay unit.

2. The air conditioner according to claim 1, wherein the relay unit or the relay expansion valve includes a silencer.

3. The air conditioner according to claim 1, wherein the relay unit is disposed at a position that is separated by 5 m or more from a connection portion of each of the indoor units to which the liquid-refrigerant connection pipe is connected, as measured along a length of the liquid-refrigerant connection pipe.

4. The air conditioner according to claim 1, wherein the relay unit is disposed at a position that is separated by 10 m or more from a connection portion of each of the indoor units to which the liquid-refrigerant connection pipe is connected, as measured along a length of the liquid-refrigerant connection pipe.

5. The air conditioner according to claim 1, further comprising:
refrigerant-leakage detection means for detecting leakage of the refrigerant, wherein
the relay gas valve is opened or closed when switching the indoor heat exchangers to function as an evaporator for the refrigerant or a radiator for the refrigerant, and
a controller that controls components of the outdoor unit, the indoor units, and the relay unit closes the relay expansion valve and the relay gas valve if the refrigerant-leakage detection means detects leakage of the refrigerant.

6. The air conditioner according to claim 1, wherein the controller closes the relay expansion valve while keeping the indoor expansion valve fully open when stopping the compressor from a state in which the controller fully opens the indoor expansion valve and controls the opening degree of the relay expansion valve, and the controller closes the indoor expansion valve while keeping the relay expansion valve fully open when stopping the compressor from a state in which the controller fully opens the relay expansion valve and controls the opening degree of the indoor expansion valve.

7. The air conditioner according to claim 1, wherein
the relay unit further includes a relay refrigerant cooler that cools the refrigerant that has been decompressed by the liquid-pressure-adjusting expansion valve, and
the relay expansion valve further decompresses the refrigerant that has been cooled by the relay refrigerant cooler.

8. The air conditioner according to claim 2, further comprising:
refrigerant-leakage detection means for detecting leakage of the refrigerant, wherein
the relay gas valve is opened or closed when switching the indoor heat exchangers to function as an evaporator for the refrigerant or a radiator for the refrigerant, and
a controller that controls components of the outdoor unit, the indoor units, and the relay unit closes the relay expansion valve and the relay gas valve if the refrigerant-leakage detection means detects leakage of the refrigerant.

9. The air conditioner according to claim 3, further comprising:
refrigerant-leakage detection means for detecting leakage of the refrigerant, wherein
the relay gas valve is opened or closed when switching the indoor heat exchangers to function as an evaporator for the refrigerant or a radiator for the refrigerant, and
a controller that controls components of the outdoor unit, the indoor units, and the relay unit closes the relay expansion valve and the relay gas valve if the refrigerant-leakage detection means detects leakage of the refrigerant.

10. The air conditioner according to claim 4, further comprising:
refrigerant-leakage detection means for detecting leakage of the refrigerant, wherein
the relay gas valve is opened or closed when switching the indoor heat exchangers to function as an evaporator for the refrigerant or a radiator for the refrigerant, and
a controller that controls components of the outdoor unit, the indoor units, and the relay unit closes the relay expansion valve and the relay gas valve if the refrigerant-leakage detection means detects leakage of the refrigerant.

11. The air conditioner according to claim 2, wherein
each of the indoor units further includes an indoor expansion valve that is connected to a liquid-side end of the indoor heat exchanger, and
a controller that controls components of the outdoor unit, the indoor units, and the relay unit fully opens the indoor expansion valve and controls an opening degree of the relay expansion valve when feeding the refrigerant from the outdoor heat exchanger to at least one of the indoor heat exchangers that functions as an evaporator for the refrigerant through the liquid-refrigerant connection pipe and the relay unit; and the controller fully opens the relay expansion valve and controls the opening degree of the indoor expansion valve when feeding the refrigerant to at least one of the indoor heat exchangers that functions as a radiator for the refrigerant through the gas-refrigerant connection pipe and the relay unit.

12. The air conditioner according to claim 3, wherein
each of the indoor units further includes an indoor expansion valve that is connected to a liquid-side end of the indoor heat exchanger, and
a controller that controls components of the outdoor unit, the indoor units, and the relay unit fully opens the indoor expansion valve and controls an opening degree of the relay expansion valve when feeding the refrigerant from the outdoor heat exchanger to at least one of the indoor heat exchangers that functions as an evaporator for the refrigerant through the liquid-refrigerant connection pipe and the relay unit; and the controller fully opens the relay expansion valve and controls the opening degree of the indoor expansion valve when feeding the refrigerant to at least one of the indoor heat exchangers that functions as a radiator for the refrigerant through the gas-refrigerant connection pipe and the relay unit.

13. The air conditioner according to claim 4, wherein
each of the indoor units further includes an indoor expansion valve that is connected to a liquid-side end of the indoor heat exchanger, and
a controller that controls components of the outdoor unit, the indoor units, and the relay unit fully opens the indoor expansion valve and controls an opening degree of the relay expansion valve when feeding the refrigerant from the outdoor heat exchanger to at least one of the indoor heat exchangers that functions as an evaporator for the refrigerant through the liquid-refrigerant connection pipe and the relay unit; and the controller fully opens the relay expansion valve and controls the opening degree of the indoor expansion valve when feeding the refrigerant to at least one of the indoor heat exchangers that functions as a radiator for the refrigerant through the gas-refrigerant connection pipe and the relay unit.

14. The air conditioner according to claim 5, wherein
each of the indoor units further includes an indoor expansion valve that is connected to a liquid-side end of the indoor heat exchanger, and
a controller that controls components of the outdoor unit, the indoor units, and the relay unit fully opens the indoor expansion valve and controls an opening degree of the relay expansion valve when feeding the refrigerant from the outdoor heat exchanger to at least one of the indoor heat exchangers that functions as an evaporator for the refrigerant through the liquid-refrigerant connection pipe and the relay unit; and the controller fully opens the relay expansion valve and controls the opening degree of the indoor expansion valve when feeding the refrigerant to at least one of the indoor heat exchangers that functions as a radiator for the refrigerant through the gas-refrigerant connection pipe and the relay unit.

15. The air conditioner according to claim 2, wherein
the relay unit further includes a relay refrigerant cooler that cools the refrigerant that has been decompressed by the liquid-pressure-adjusting expansion valve, and
the relay expansion valve further decompresses the refrigerant that has been cooled by the relay refrigerant cooler.

16. The air conditioner according to claim 3, wherein
the relay unit further includes a relay refrigerant cooler that cools the refrigerant that has been decompressed by the liquid-pressure-adjusting expansion valve, and
the relay expansion valve further decompresses the refrigerant that has been cooled by the relay refrigerant cooler.

17. The air conditioner according to claim 4, wherein
the relay unit further includes a relay refrigerant cooler that cools the refrigerant that has been decompressed by the liquid-pressure-adjusting expansion valve, and
the relay expansion valve further decompresses the refrigerant that has been cooled by the relay refrigerant cooler.

18. The air conditioner according to claim 5, wherein
the relay unit further includes a relay refrigerant cooler that cools the refrigerant that has been decompressed by the liquid-pressure-adjusting expansion valve, and
the relay expansion valve further decompresses the refrigerant that has been cooled by the relay refrigerant cooler.

* * * * *